(12) United States Patent
Ueda

(10) Patent No.: US 10,180,094 B2
(45) Date of Patent: Jan. 15, 2019

(54) INTERNAL COMBUSTION ENGINE

(71) Applicant: TOYOTA JIDOSHA KABUSHIKI KAISHA, Toyota-shi, Aichi-ken (JP)

(72) Inventor: Hiroyoshi Ueda, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 198 days.

(21) Appl. No.: 15/230,755

(22) Filed: Aug. 8, 2016

(65) Prior Publication Data

US 2017/0044947 A1 Feb. 16, 2017

(30) Foreign Application Priority Data

Aug. 10, 2015 (JP) .................. 2015-158229

(51) Int. Cl.
| | |
|---|---|
| *F01N 3/20* | (2006.01) |
| *F01N 3/10* | (2006.01) |
| *F01N 3/021* | (2006.01) |
| *F01N 13/00* | (2010.01) |
| *F01N 9/00* | (2006.01) |

(52) U.S. Cl.
CPC ........... *F01N 3/2006* (2013.01); *F01N 3/021* (2013.01); *F01N 3/103* (2013.01); *F01N 3/2066* (2013.01); *F01N 13/009* (2014.06); *F01N 9/00* (2013.01); *F01N 2240/10* (2013.01); *F01N 2240/12* (2013.01); *F01N 2250/12* (2013.01); *F01N 2900/1602* (2013.01); *F01N 2900/1631* (2013.01); *Y02T 10/24* (2013.01); *Y02T 10/26* (2013.01)

(58) Field of Classification Search
CPC ...... F01N 3/1006; F01N 3/2066; F01N 3/206; F01N 3/021; F01N 3/103; F01N 13/009; F01N 9/00; F01N 2240/10; F01N 2240/12; F01N 2250/12; F01N 2900/1602; F01N 2900/1631; Y02T 10/24; Y02T 10/26
USPC .......................................................... 60/300
See application file for complete search history.

(56) References Cited

U.S. PATENT DOCUMENTS

2015/0192049 A1 7/2015 Suzuki et al.

FOREIGN PATENT DOCUMENTS

| JP | 2005-351108 A | 12/2005 |
|---|---|---|
| JP | 2014-051972 A | 3/2014 |
| JP | 2014-095294 A | 5/2014 |

*Primary Examiner* — Phutthiwat Wongwian
*Assistant Examiner* — Kelsey Stanek
(74) *Attorney, Agent, or Firm* — Hunton Andrews Kurth LLP

(57) ABSTRACT

An internal combustion engine, wherein a chemical thermal storage device is provided with a first heater including a first element generating heat when chemically adsorbing a reaction medium supplied from a storage part through a first connection pipe and desorbing the reaction medium if heated by the heat of exhaust in a state chemically adsorbing the reaction medium and a second heater including a second element generating heat when chemically adsorbing a reaction medium supplied from a storage part through a second connection pipe and desorbing the reaction medium if heated by the heat of exhaust in a state chemically adsorbing the reaction medium and wherein the control device controls the opening degrees of the first valve and the second valve so that the reaction medium supplied to the second heater is preferentially recovered at the storage part.

5 Claims, 15 Drawing Sheets

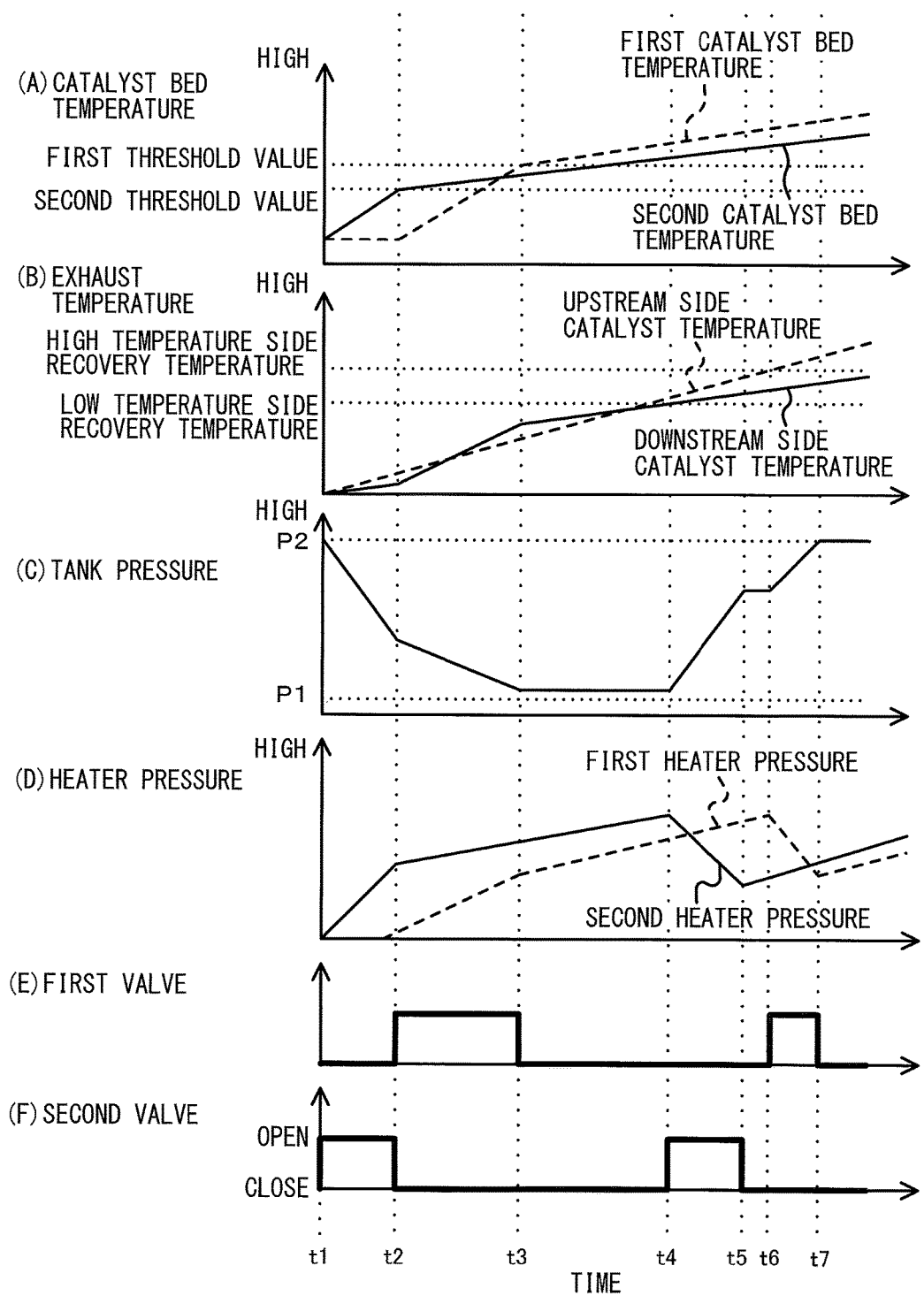

INTERNAL COMBUSTION ENGINE

CROSS-REFERENCE TO RELATED APPLICATION

This application claims priority based on Japanese Patent Application No. 2015-158229 filed with the Japan Patent Office on Aug. 10, 2015, the entire contents of which are incorporated into the present specification by reference.

TECHNICAL FIELD

The present invention relates to an internal combustion engine.

BACKGROUND ART

JP2014-95294A discloses an internal combustion engine provided with a chemical thermal storage device including two tanks storing a reaction medium and two heaters heating a heated object by the heat of reaction of a chemical reaction between the reaction medium and a chemical thermal storage medium.

SUMMARY

However, in this conventional chemical thermal storage device, to make the reaction temperature of the second heater higher than the reaction temperature of the first heater, the first heater and the second heater were respectively supplied with different types of reaction media. For this reason, one tank each was required for storing each reaction medium. There was the problem that the chemical thermal storage device became large in size. Further, in this conventional chemical thermal storage device, the exhaust temperature required when recovering the reaction medium from the second heater became higher than the exhaust temperature required when recovering the reaction medium from the first heater. For this reason, there was the problem that it was difficult to recover the reaction medium from the second heater.

The present invention was made focusing on such a problem and has as its object to provide a chemical thermal storage device provided with at least two heaters at the upstream side and downstream side of the exhaust passage wherein the increase in size of the chemical thermal storage device is suppressed while recovery of the reaction medium from the downstream side heater, where recovery of the reaction medium is difficult since the exhaust temperature becomes relatively low, is facilitated.

To solve this problem, the internal combustion engine according to one aspect of the present invention is comprised of an engine body, a first heated object arranged at an exhaust passage of the engine body, a second heated object arranged at the exhaust passage at a downstream side from the first heated object, a chemical thermal storage device configured to heat the first heated object and the second heated object, and a control device configured to control the chemical thermal storage device. The chemical thermal storage device includes a storage part configured to store a reaction medium, a first heater including a first element generating heat when a reaction medium supplied from the storage part through a first connection pipe is chemically adsorbed and causing the reaction medium to be desorbed if heated by the exhaust heat in a state where the reaction medium is chemically adsorbed and arranged in the exhaust passage at an upstream side from the first heated object, a second heater including a second element generating heat when a reaction medium supplied from the storage part through a second connection pipe is chemically adsorbed and causing the reaction medium to be desorbed if heated by the exhaust heat in a state where the reaction medium is chemically adsorbed and arranged in the exhaust passage between the first heated object and second heated object, a first valve arranged at the first connection pipe, and a second valve arranged at the second connection pipe. The control device is configured to control opening degrees of the first valve and second valve so that when the reaction medium is chemically adsorbed at both the first element and the second element, the reaction medium chemically adsorbed at the second element is preferentially recovered at the storage part.

When the reaction medium is supplied to both the first heater and second heater, that is, when the reaction medium is chemically adsorbed at both the first element and second element, compared with the state after the reaction medium of either of the first heater and second heater is recovered at the storage part from that state, the pressure of the storage part becomes relatively low. For this reason, by preferentially recovering the reaction medium supplied to the second heater at the storage part when the reaction medium is supplied to both the first heater and second heater as in this aspect of the present invention, it is possible to make the recovery temperature of the second heater lower than the recovery temperature of the first heater. Accordingly, it is possible to easily recover the reaction medium from the second heater arranged at the downstream side of the exhaust pipe where the exhaust temperature becomes lower compared with the upstream side of the exhaust pipe. Further, a single storage part storing a reaction medium is sufficient, so the chemical thermal storage device can be kept from becoming larger in size.

BRIEF DESCRIPTION OF DRAWINGS

FIG. 17 is a time chart explaining the operation for control of the chemical thermal storage device according to one embodiment of the present invention.

DESCRIPTION OF EMBODIMENTS

Figure 1:
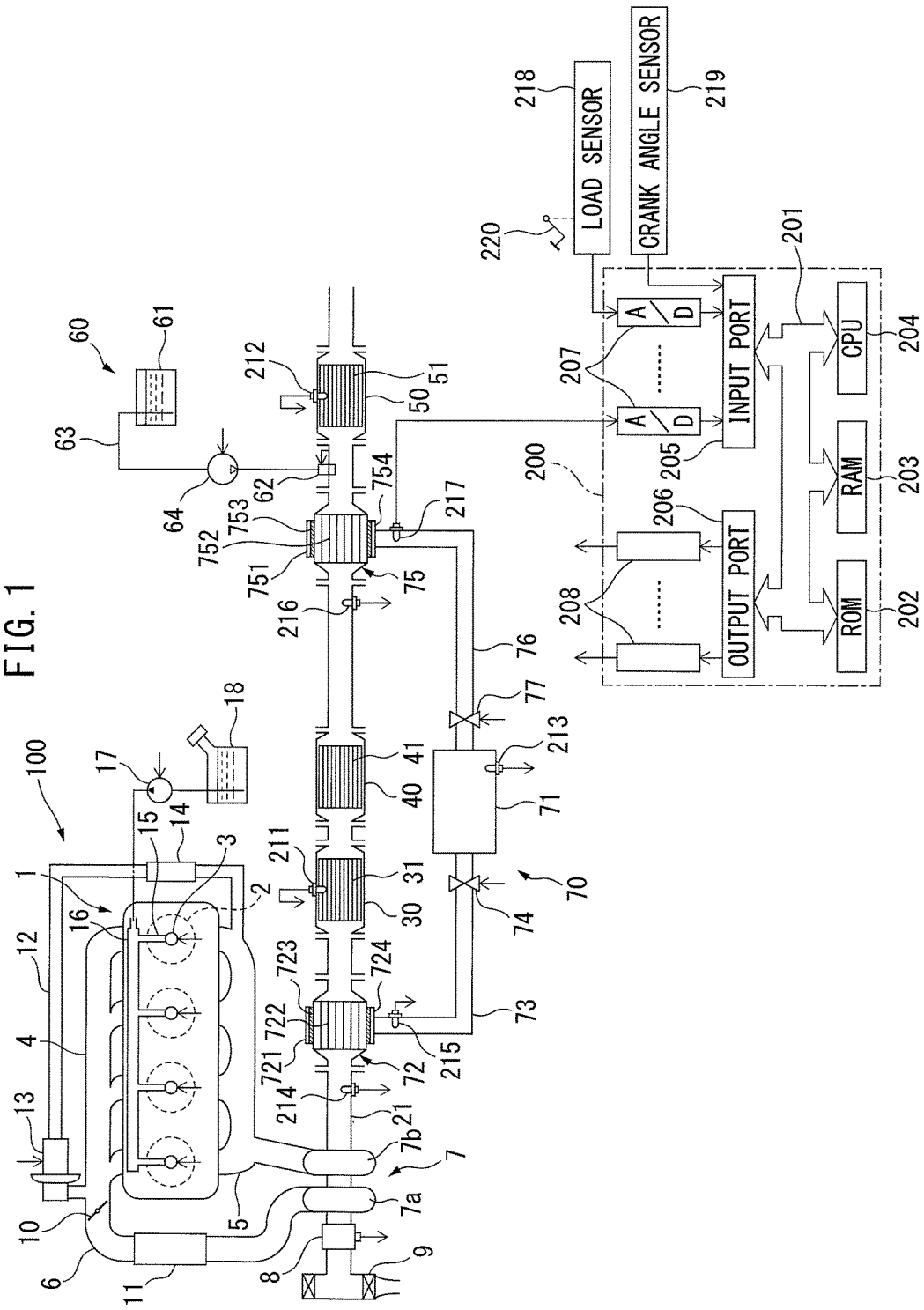
FIG. 1 is a schematic view of the configuration of an internal combustion engine according to one embodiment of the present invention and an electronic control unit controlling the internal combustion engine.

Below, referring to the drawings, embodiments of the present invention will be explained in detail. Note that, in the following description, similar component elements will be assigned the same reference notations.

FIG. 1 is a schematic view of the configuration of an internal combustion engine 100 according to an embodiment of the present invention and an electronic control unit 200 for controlling the internal combustion engine 100.

The internal combustion engine 100 is provided with an engine body 1 burning fuel at the inside by compression self-ignition to for example generate power for driving the vehicle etc. The engine body 1 includes a combustion chamber 2 formed at each cylinder, an electronic control type fuel injector 3 for injecting fuel to each combustion chamber 2, an intake manifold 4 for introducing intake air to the combustion chambers 2, and an exhaust manifold 5 for discharging exhaust from the insides of the combustion chambers 2.

Each fuel injector 3 is connected through a fuel supply pipe 15 to a common rail 16. The common rail 16 is connected through a variable discharge electronic control type fuel pump 17 to a fuel tank 18. The fuel stored in the fuel tank 18 is supplied by the fuel pump 17 to the inside of the common rail 16. The fuel supplied to the inside of the common rail 16 is supplied through each fuel supply pipe 15 to a fuel injector 3.

The intake manifold 4 is connected through an intake duct 6 to an output of a compressor 7a of an exhaust turbocharger 7. An inlet of the compressor 7a is connected through an air flow meter 8 to an air cleaner 9. Inside the intake duct 6, an electrical control type throttle valve 10 driven by a step motor is arranged. Around the intake duct 6, a cooling device 11 is arranged for cooling the intake air flowing through the inside of the intake duct 6.

The exhaust manifold 5 is connected to an inlet of an exhaust turbine 7b of the exhaust turbocharger 7. The outlet of the exhaust turbine 7b is connected to an exhaust pipe 21 where an exhaust post-treatment device 20 is provided. The exhaust manifold 5 and the intake manifold 4 are connected with each other through an exhaust gas recirculation (below referred to as "EGR") passage 12 for EGR. Inside the EGR passage 12, an electronic control type EGR control valve 13 is arranged. Around the EGR passage 12, an EGR cooler 14 is arranged for cooling the EGR gas flowing through the inside of the EGR passage 12.

The exhaust post-treatment device 20 is a device for removing harmful substances in the exhaust discharged from the engine body 1, then discharging the exhaust into the outside air. The exhaust post-treatment device 20 is provided with a first catalytic converter 30, particulate trapping device 40, second catalytic converter 50, urea aqueous solution supply device 60, and chemical thermal storage device 70.

The first catalytic converter 30 is comprised of a carrier 31 carrying an exhaust purification catalyst comprised of an oxidation catalyst (two-way catalyst) and is provided at the exhaust pipe 21. The first catalytic converter 30 is provided with a first catalyst bed temperature sensor 211 for detecting the temperature of the carrier 31 corresponding to the temperature of the oxidation catalyst (below referred to as the "first catalyst bed temperature"). The oxidation catalyst oxidizes the harmful substances in the exhaust, that is, the hydrocarbons (HC) and carbon monoxide (CO), and renders them harmless substances (water and carbon dioxide).

The particulate trapping device 40 is provided in the exhaust pipe at the downstream side from the first catalytic converter 30. The particulate trapping device 40 has a wall-flow type particulate filter 41 built into it and runs exhaust introduced inside it through the particulate filter 41 to trap the particulate matter in the exhaust.

The second catalytic converter 50 is comprised of a carrier 51 carrying an exhaust purification catalyst comprised of an $NO_X$ selective reduction catalyst (SRC) and is provided at the exhaust pipe at the downstream side from the particulate trapping device 40. The $NO_X$ selective reduction catalyst selectively reduces the harmful substances in the exhaust, that is, the $NO_X$, and renders them to harmless substances (water and nitrogen) by being supplied with a reducing agent. The $NO_X$ selective reduction catalyst according to the present embodiment selectively reduces the $NO_X$ contained in the exhaust using the ammonia produced by hydrolysis of the urea aqueous solution as a reducing agent. The second catalytic converter 50 is provided with a second catalyst bed temperature sensor 212 for detecting the temperature of the carrier 51 corresponding to the temperature of the $NO_X$ selective reduction catalyst (below, referred to as the "second catalyst bed temperature").

The urea aqueous solution supply device 60 is provided with a urea aqueous solution tank 61, urea aqueous solution injector 62, urea aqueous solution supply pipe 63, and electric pump 64.

The urea aqueous solution tank 61 stores the urea aqueous solution.

The urea aqueous solution injector 62 is provided in the exhaust pipe 21 at the downstream side from the second reactor of the later explained chemical thermal storage device 70 and at the upstream side of the second catalytic converter 50 and injects urea aqueous solution inside of the exhaust pipe 21. The urea aqueous solution injector 62 is, for example, a needle valve and is controlled to operate by an electronic control unit 200. By controlling the opening time period of the urea aqueous solution injector 62, the flow rate of urea aqueous solution injected from the urea aqueous solution injector 62 is controlled. The urea aqueous solution injected to the inside of the exhaust pipe 21 is hydrolyzed by receiving the heat of exhaust and being heated until a predetermined hydrolysis temperature (for example 180° C.).

The urea aqueous solution supply pipe 63 is a passage for supplying urea aqueous solution stored in the urea aqueous solution tank 61 to the urea aqueous solution injector 62. The urea aqueous solution supply pipe 63 is connected at one end to the urea aqueous solution tank 61 and is connected at the other end to the urea aqueous solution injector 62.

The electric pump 64 is provided at the urea aqueous solution supply pipe 63 and is controlled to be driven by the electronic control unit 200. By driving the electric pump 64, the urea aqueous solution stored in the urea aqueous solution tank 61 is pumped toward the urea aqueous solution injector 62.

In order for the exhaust purification catalysts carried at the carriers 31, 51 of the first catalytic converter 30 and second catalytic converter 50 to exhibit their desired exhaust purification performance, it is necessary to raise the exhaust purification catalysts to a predetermined activation temperature (for example, 200° C.) to activate the exhaust purification catalysts. Therefore, to suppress the deterioration of the exhaust emission, it is effective to activate the exhaust purification catalysts quickly.

Further, to selectively reduce the $NO_X$ by the $NO_X$ selective reduction catalyst carried on the carrier 51 of the second catalytic converter 50, it is necessary to hydrolyze the urea aqueous solution injected from the urea aqueous solution injector 62 to convert it to ammonia, but to hydrolyze a urea aqueous solution, it is necessary to heat the urea aqueous solution to a predetermined hydrolysis temperature or more.

Therefore, in the present embodiment, as a device for warming up the first catalytic converter 30 and second catalytic converter 50 according to need and promote hydrolysis of the urea aqueous solution, the chemical thermal storage device 70 is provided.

The chemical thermal storage device 70 according to the present embodiment is provided with a tank 71, first reactor 72, first connection pipe 73, first valve 74, second reactor 75, second connection pipe 76, and second valve 77. The chemical thermal storage device 70 utilizes the heat of reaction accompanying a reversible thermodynamic reaction between the reaction medium stored in the tank 71 and the chemical thermal storage medium provided at the insides of the first reactor 72 and second reactor 75 to warm up the objects to be heated, that is, the first catalytic converter 30 and second catalytic converter 50. Below, the component parts of the chemical thermal storage device 70 will be explained.

The tank 71 stores a reaction medium comprised of ammonia gas. The tank 71 has a physical adsorption material for physically adsorbing ammonia gas at its inside and stores ammonia gas in a state adsorbed at the physical adsorption material. As the physical adsorption material, for example, active carbon, zeolite, etc. can be used. Further, at the tank 71, to obtain a grasp of the amount of storage of ammonia gas inside the tank 71, a tank pressure sensor 213 for detecting the pressure inside the tank 71 (below referred to as the "tank pressure") is attached.

The first reactor 72 is provided with a casing 721, heat conductor 722, and first chemical thermal storage medium 723 and is provided at the exhaust pipe 21 at the upstream side from the first catalytic converter 30. At the exhaust pipe 21 at the upstream side from the first reactor 72, an upstream side exhaust temperature sensor 214 is provided for detecting the temperature of the exhaust gas flowing into the first reactor 72 and flowing through the inside of the heat conductor 722 (below referred to as the "upstream side exhaust temperature").

The first reactor 72 will be further explained with reference to the cross-sectional view along the axial direction of the first reactor 72 shown in FIG. 2 (exhaust flow direction) and the cross-sectional view along the diametrical direction of the first reactor 72 shown in FIG. 3.

Figure 2:
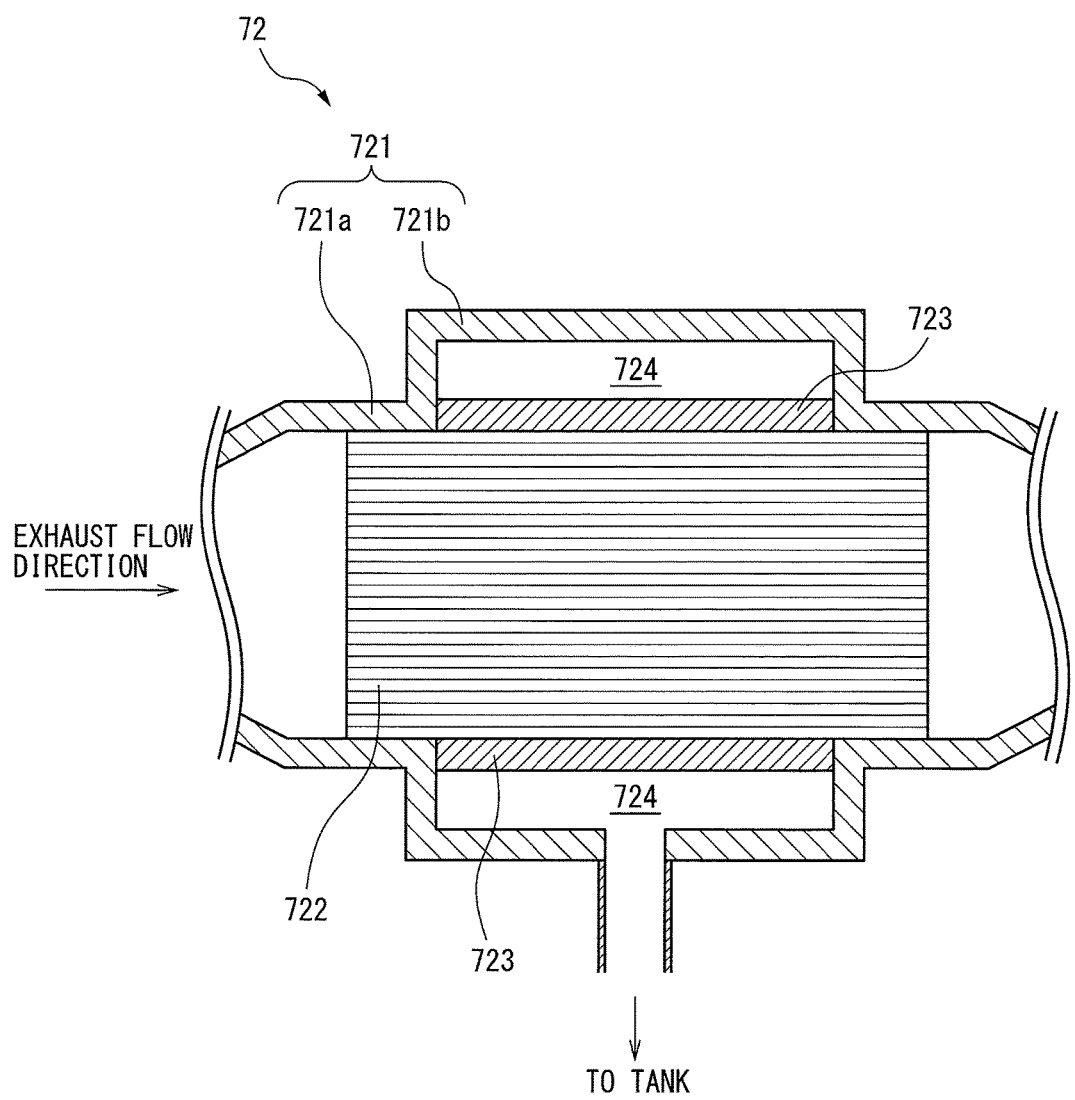
FIG. 2 is a cross-sectional view along an axial direction of a first reactor.
Figure 3:
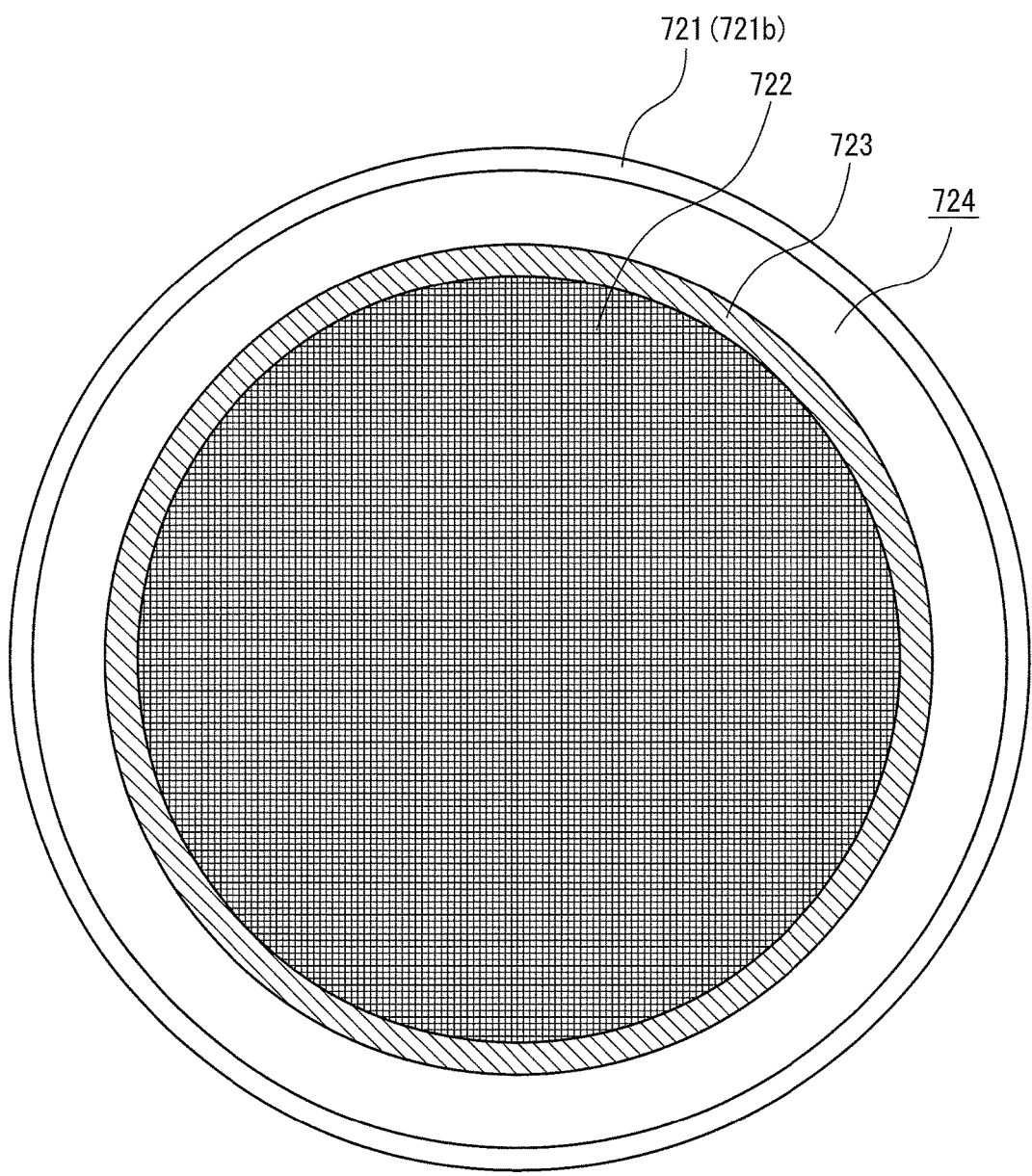
FIG. 3 is a cross-sectional view along a diametrical direction of a first reactor.

As shown in FIG. 2, the casing 721 is provided with holding parts 721a holding the outer circumferences of the two ends of the heat conductor 722 and a first reaction chamber forming part 721b provided from the holding parts 721a to the outside in the diametrical direction so that a circular ring shaped space is formed as the first reaction chamber 724 between the casing 721 and the heat conductor 722.

The heat conductor 722 has a cross-section in the diametrical direction of a honeycomb shape and is formed by a metal material excellent in heat conductivity. At the outer circumferential surface of the heat conductor 722 positioned at the inside of the first reaction chamber 724, a first chemical thermal storage medium 723 is provided so as to cover the outer circumferential surface and exchanges heat between exhaust flowing through the inside of the heat conductor 722 via the heat conductor 722 and the first chemical thermal storage medium 723 provided at the outer circumferential surface of the heat conductor 722.

The first chemical thermal storage medium 723 is comprised of a material generating heat (releasing heat) when the reaction medium comprised of the ammonia gas is chemically adsorbed (for example bonded by coordinate bonds) and absorbing heat (storing heat) when the chemically adsorbed ammonia gas is desorbed. As such a chemical thermal storage medium, a divalent chloride, divalent bromide, divalent iodide, etc. may be mentioned. In the present embodiment, as the first chemical thermal storage medium 723, a divalent chloride comprised of magnesium chloride ($MgCl_2$) is used.

Returning to FIG. 1, the first connection pipe 73 is a passage connected at one end to the tank 71 and connected at the other end to the reaction chamber forming part 721b of the casing 721. Ammonia gas is transferred through the first connection pipe 73 between the tank 71 and the first reaction chamber 724.

The first valve 74 is provided at the first connection pipe 73. If the first valve 74 is opened, ammonia gas can be transferred between the tank 71 and the first reaction chamber 724. The operation of the first valve 74 is controlled by the electronic control unit 200.

The first pressure sensor 215 is provided at the first connection pipe 73 between the first valve 74 and the first reactor 72. In the present embodiment, the detected value of the first pressure sensor 215 is used as the pressure inside the first reaction chamber 724 of the first reactor 72 (below referred to as the "first heater pressure").

The second reactor 75 is configured in the same way as the first reactor 72 and is provided with a casing 751, heat conductor 752, and second chemical thermal storage medium 753. It is provided in the exhaust pipe 21 between the particulate trapping device 40 and the second catalytic converter 50. Between the casing 751 and the heat conductor 752, a second reaction chamber 754 comprised of a circular ring shaped space is formed. The volume of the second reaction chamber 754 is the same as the volume of the first reaction chamber 724. At the exhaust pipe 21 at the upstream side from the second reactor 75 as well, a downstream side exhaust temperature sensor 216 is provided for detecting the temperature of the exhaust flowing into the second reactor 75 and through the inside of the heat conductor (below referred to as the "downstream side exhaust temperature"). In the present embodiment, as the second chemical thermal storage medium 753, the divalent chloride of magnesium chloride ($MgCl_2$) is used.

The second connection pipe 76 is a passage connected at one end to the tank 71 and connected at the other end to the reaction chamber forming part of the casing 751. Ammonia gas is transferred through the second connection pipe 76 between the tank 71 and the second reaction chamber 754. The flow resistance of the second connection pipe 76 is the same as the flow resistance of the first connection pipe 73.

The second valve 77 is provided at the second connection pipe 76. If the second valve 77 is opened, ammonia gas can be transferred between the tank 71 and the second reaction chamber 754. The operation of the second valve 77 is controlled by the electronic control unit 200.

The second pressure sensor 217 is provided at the second connection pipe 76 between the second valve 77 and the second reactor 75. in the present embodiment, the detected value of the second pressure sensor 217 is used as the pressure inside the second reaction chamber 754 of the second reactor 75 (below referred to as the "second heater pressure").

In this way, the chemical thermal storage device 70 according to the present embodiment is configured so as to be able to supply the ammonia gas stored in a single tank 71 to the first reactor 72 and second reactor 75.

Note that, the chemical thermal storage device 70 according to the present embodiment, as explained above, is configured to heat the exhaust and indirectly warm the first catalytic converter 30 and second catalytic converter 50, but the invention is not limited to such a configuration. For example, it may also be configured by providing a reaction chamber at the outer circumference of the catalytic converter and providing a chemical thermal storage medium at the outer circumferential surface of the catalytic converter to directly heat the exhaust purification catalyst and thereby enabling the catalytic converter to be warmed up. Further, it may also be configured by combining a reactor and catalytic converter, carrying the exhaust purification catalyst on the inner surface of a honeycomb shaped heat conductor to directly heat the exhaust purification catalyst, and thereby warming up the catalytic converter.

The electronic control unit 200 is comprised of a digital computer provided with components connected with each other by a bidirectional bus 201 such as a ROM (read only memory) 202, RAM (random access memory) 203, CPU (microprocessor) 204, input port 205, and output port 206.

At the input port 205, the output signals of the abovementioned air flow meter 8 etc. are input through corresponding A/D converters 207. Further, at the input port 205, an output voltage of a load sensor 218 generating an output voltage proportional to the amount of depression of an accelerator pedal 220 (below referred to as the "amount of depression of the accelerator") is input through a corresponding A/D converter 207. Furthermore, at the input port 205, as a signal for calculating the engine speed, the output signal of a crank angle sensor 219 generating an output pulse every time a crankshaft of the engine body 1 for example rotates by 15°.

At the output port 206, the fuel injectors 3 and urea aqueous solution injector 62, the first valve 74 and second valve 77 of the chemical thermal storage device 70, and other controlled parts are electrically connected through corresponding drive circuits 208.

The electronic control unit 200 uses the output signals of the various different sensors input to the input port 205 as the basis to output control signals for controlling the different control parts from the output port 206 and control the internal combustion engine 100.

Here, if using a reaction medium comprised of ammonia gas and using a first chemical thermal storage medium 723 and second chemical thermal storage medium 753 comprised of magnesium chloride, the reversible thermodynamic reaction shown in the following reaction formula (1) in the reaction chambers 724, 725 occurs:

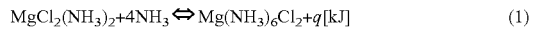
$$MgCl_2(NH_3)_2 + 4NH_3 \Leftrightarrow Mg(NH_3)_6Cl_2 + q[kJ] \quad (1)$$

Specifically, when the temperatures of the exhaust flowing into the reactors 72, 75 are lower than the later explained recovery temperature, if ammonia gas is supplied from the tank 71 to the insides of the reaction chambers 724, 754, reactions occur where ammonia gas is chemically adsorbed at the chemical thermal storage media 723, 753 in the reaction chambers 724, 754, that is, exothermic reactions occur where the reaction proceeds in the right direction in the reaction formula (1) (heat radiating operation).

At this time, the total amount of heat obtained by the exothermic reaction until the reversible thermodynamic reaction of the reaction formula (1) reaches chemical equilibrium in the reaction chambers 724, 754 changes depending on the tank pressure before supplying ammonia gas to the reaction chambers 724, 754. Specifically, the higher the tank pressure before supplying ammonia gas to the reaction chambers 724, 754, the higher the pressures inside the reaction chambers 724, 754 during the supply of ammonia gas and the more the amounts of ammonia gas used in the exothermic reaction in the reaction chambers 724, 754 increase (the more the amounts of ammonia gas chemically adsorbed at the chemical thermal storage media 723, 753 increase), so the total amount of heat obtained in the reversible thermodynamic reaction of the reaction formula (1) becomes greater.

Therefore, the higher the tank pressure before supplying ammonia gas to the reaction chambers 724, 754, the higher the temperatures of the chemical thermal storage media 723, 753 when the reversible thermodynamic reaction of reaction formula (1) reaches chemical equilibrium in the reaction chambers 724, 754. Note that in the following description, the temperatures of the chemical thermal storage media 723, 753 when the reversible thermodynamic reaction of reaction formula (1) reaches chemical equilibrium in the reaction chambers 724, 754 will also be referred to as the "reaction temperatures of the reactors 72, 75" according to need.

The tank pressure falls due to supplying ammonia gas to the reaction chambers 724, 754. Therefore, for example, just the first valve 74 is opened to supply ammonia gas to the first reaction chamber 724 from the state where ammonia gas is not being supplied to the reaction chambers 724, 754, then, when chemical equilibrium is reached, the first valve 74 is closed and the second valve 77 is opened to supply ammonia gas from the tank 71 to the second reaction chamber 754.

In this case, the tank pressure before supplying ammonia gas to the first reaction chamber 724 becomes higher than the tank pressure before supplying ammonia gas to the second reaction chamber 754, so the temperature of the first chemical thermal storage medium 723 becomes higher than the temperature of the second chemical thermal storage medium 753. That is, the reaction temperature of the first reactor 72 becomes higher than the reaction temperature of the second reactor 75.

Conversely, just the second valve 77 is opened to supply ammonia gas to the second reaction chamber 754 from the state where ammonia gas is not being supplied to the reaction chambers 724, 754, then, when chemical equilibrium is reached, the second valve 77 is closed and the first valve 74 is opened to supply ammonia gas from the tank 71 to the first reaction chamber 724.

In this case, the tank pressure before supplying ammonia gas to the second reaction chamber 754 becomes higher than the tank pressure before supplying ammonia gas to the first reaction chamber 724, so the temperature of the second chemical thermal storage medium 753 becomes higher than the temperature of the first chemical thermal storage medium 723. That is, the reaction temperature of the second reactor 75 becomes higher than the reaction temperature of the first reactor 72.

Figure 4:
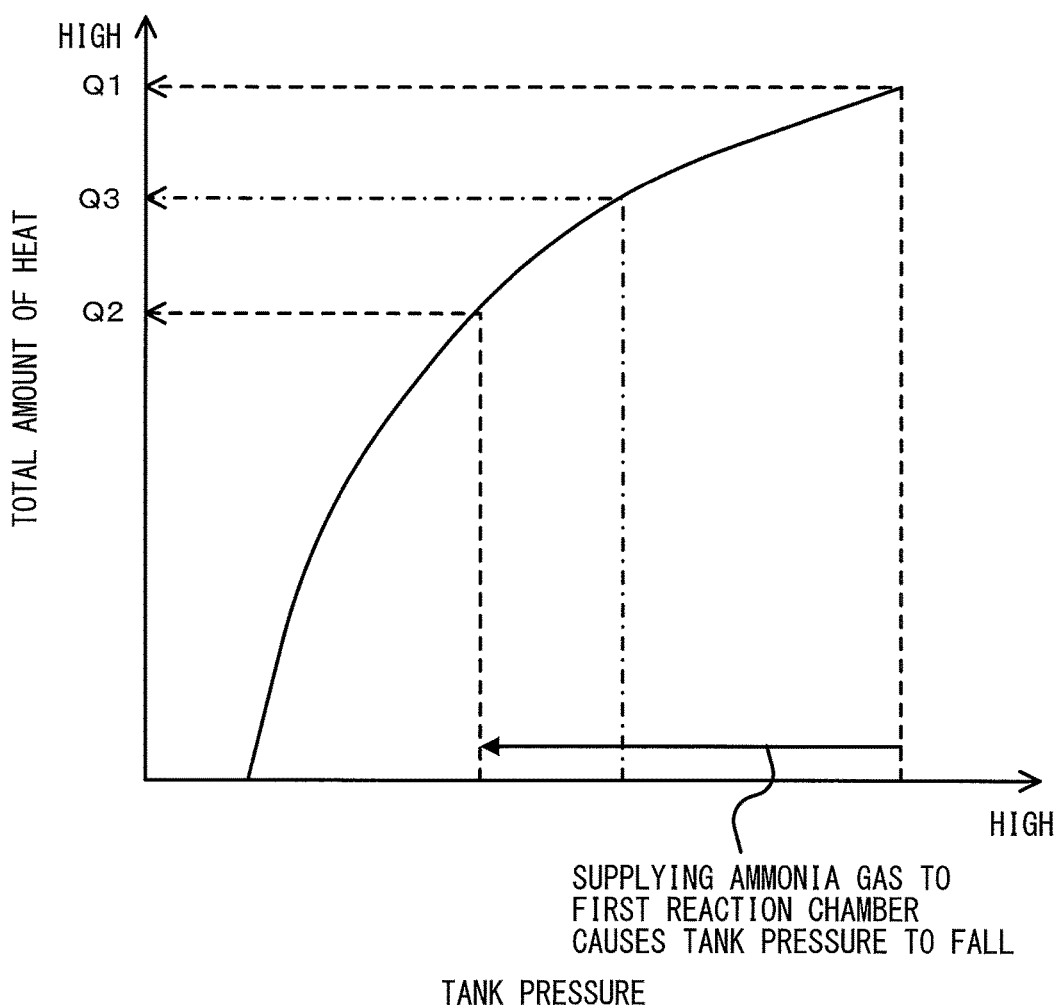
FIG. 4 is a view showing a relationship between a tank pressure before supplying ammonia gas to a reaction chamber and a total amount of heat obtained by that reaction chamber.

FIG. 4 is a view showing the relationship between the tank pressure before supplying ammonia gas to a reaction chamber and the total amount of heat obtained at the reaction chamber.

FIG. 4 shows as one example, by a broken line, the relationship between the total amount of heat Q1 obtained at the first reaction chamber 724 and the total amount of heat Q2 obtained at the second reaction chamber 754 when just the first valve 74 is opened to supply ammonia gas to the first reaction chamber 724 from the state where ammonia gas is not being supplied to the reaction chambers 724, 754, then the first valve 74 is closed and the second valve 77 is opened to supply ammonia gas from the tank 71 to the second reaction chamber 754.

As shown in FIG. 4, it will be learned that as the tank pressure before supplying ammonia gas to the reaction chamber becomes lower, the total amount of heat obtained at the reaction chamber also becomes lower.

For this reason, as shown in FIG. 4 by the broken line, in the case where, for example, just the first valve 74 is opened to supply ammonia gas from the tank 71 to the first reaction chamber 724 from the state where ammonia gas is not being supplied to the reaction chambers 724, 754, then the first valve 74 is closed and the second valve 77 is opened to supply ammonia gas from the tank 71 to the second reaction chamber 754, the total amount of heat Q1 obtained at the first reaction chamber 724 becomes larger than the total amount of heat Q2 obtained at the second reaction chamber 754.

Note that, when simultaneously opening the first valve 74 and second valve 77 and supplying ammonia gas to the reaction chambers 724, 754 from the state where ammonia gas is not being supplied to the reaction chambers 724, 754, as shown by the one-dot chain line in FIG. 4, the total amounts of heat Q3 obtained at the reaction chambers 724, 754 become the same. In this case, the total amounts of heat Q3 obtained at the reaction chambers 724, 754 become smaller than the total amount of heat Q1 and larger than the total amount of heat Q2.

On the other hand, to recover the ammonia gas supplied to the reaction chambers 724, 754 and chemically adsorbed at the chemical thermal storage media 723, 753 from the insides of the reaction chambers 724, 754 at the tank 71, in addition to the amounts of heat required for making the ammonia gas desorb at the chemical thermal storage media 723, 753, it is necessary to cause an endothermic reaction where the reversible thermodynamic reaction of the reaction formula (1) proceeds in the left direction (heat storage operation). For this reason, the temperatures of the exhaust flowing into the reactors 72, 75 have to become temperatures enabling the amounts of heat required for making ammonia gas desorb at the chemical thermal storage media 723, 753 (below referred to as the "recovery temperature") or more.

Further, this recovery temperature changes depending on the tank pressure before recovering ammonia gas from the reaction chambers 724, 754. Specifically, the lower the tank pressure before recovering ammonia gas from the reaction chambers 724, 754, the pressures at the reaction chambers 724, 754 during recovery of ammonia gas also become lower and ammonia gas easily desorbs from the chemical thermal storage media 723, 753 in the reaction chambers 724, 754, so the amounts of heat required for causing ammonia gas to desorb from the chemical thermal storage media 723, 753 also can be reduced. Therefore, the lower the tank pressure before recovering ammonia gas from the reaction chambers 724, 754, the more the recovery temperature falls.

The tank pressure increases by recovery of ammonia gas from the reaction chambers 724, 754. Therefore, for example, from the state where ammonia gas is being supplied to the reaction chambers 724, 754, just the first valve 74 is opened to recover ammonia gas from the first reaction chamber 724 at the tank 71, then the first valve 74 is closed and the second valve 77 is opened to recover the ammonia gas from the second reaction chamber 754 at the tank 71.

In this case, the tank pressure before recovering ammonia gas from the first reaction chamber 724 becomes lower than the tank pressure before recovering ammonia gas from the second reaction chamber 754. Therefore, it is possible to make the recovery temperature required for recovering ammonia gas from the first reaction chamber 724 lower than the recovery temperature required for recovering ammonia gas from the second reaction chamber 754.

Conversely, just the second valve 77 is opened to recover ammonia gas from the second reaction chamber 754 at the tank 71 from the state where ammonia gas is being supplied to the reaction chambers 724, 754, then the second valve 77 is closed and the first valve 74 is opened to recover the ammonia gas from the first reaction chamber 724 at the tank 71.

In this case, the tank pressure before recovering ammonia gas from the second reaction chamber 754 becomes lower than the tank pressure before recovering ammonia gas from the first reaction chamber 724. Accordingly, the recovery temperature required for recovering ammonia gas from the second reaction chamber 754 can be made lower than the recovery temperature required for recovering ammonia gas from the first reaction chamber 724.

In the following description, when ammonia gas is being supplied to the reactors 72, 75, the recovery temperature required for recovering ammonia gas from one of the reactors will be referred to according to need as the "low temperature side recovery temperature". Further, the recovery temperature required for recovering ammonia gas from the other reactor after recovering ammonia gas from that one reactor will if necessary be referred to as the "high temperature side recovery temperature". Note that, when ammonia gas is supplied to the reaction chambers 724, 754, the first valve 74 and second valve 77 are simultaneously opened and the recovery temperatures required for recovering ammonia gas from the reaction chambers 724, 754 become the same. Further, the recovery temperature at this time becomes a temperature between the low temperature side recovery temperature and the high temperature side recovery temperature (below referred to as the "intermediate recovery temperature").

In this way, the chemical thermal storage device 70 according to the present embodiment is configured to be able to supply ammonia gas stored in a single tank 71 to the different reactors 72, 75, so it is possible to make the reaction temperatures of the reactors 72, 75 variable. That is, according to the chemical thermal storage device 70 according to the present embodiment, by changing the order when supplying ammonia gas from the tank 71 to the reactors 72, 75, the reaction temperature of the first reactor 72 can be made higher than the reaction temperature of the second reactor 75 and conversely the reaction temperature of the second reactor 75 can be made higher than the reaction temperature of the first reactor 72.

Further, the chemical thermal storage device 70 according to the present embodiment is configured to be able to recover the ammonia gas supplied to the reactors 72, 75 at a single tank 71, so it is possible to make the recovery temperatures at the reactors 72, 75 variable. That is, according to the chemical thermal storage device 70 according to the present embodiment, it is possible to change the order when recovering ammonia gas from the reactors 72, 75 at the tank 71 and thereby lower the recovery temperature of the first reactor 72 from the recovery temperature of the second reactor 75 and conversely lower the recovery temperature of the second reactor 75 from the recovery temperature of the first reactor 72.

Here, in the present embodiment, the first reactor 72 is provided at the upstream side of the exhaust pipe 21 and the second reactor 75 is provided at the downstream side of the exhaust pipe 21. For this reason, the temperature of the exhaust flowing into the second reactor 75 basically becomes lower than the temperature of the exhaust flowing into the first reactor 72. Therefore, the ammonia gas supplied to the second reactor 75 basically becomes difficult to recover compared with the ammonia gas supplied to the first reactor 72.

Therefore, in the present embodiment, when supplying ammonia gas to the reactors 72, 75, the priority order when recovering ammonia gas from the reactors 72, 75 to the tank 71 in accordance with the operating state of the engine body was decided and basically ammonia gas supplied to the second reactor 75 was recovered on a priority basis. Due to this, it is possible to make the recovery temperature of the second reactor 75 lower than the recovery temperature of the first reactor 72, so it becomes possible to easily recover ammonia gas even from the second reactor 75 from which recovery of ammonia gas is more difficult than the first reactor 72.

Below, control of the chemical thermal storage device 70 according to the present embodiment performed by the electronic control unit 200 will be explained.

Figure 5:
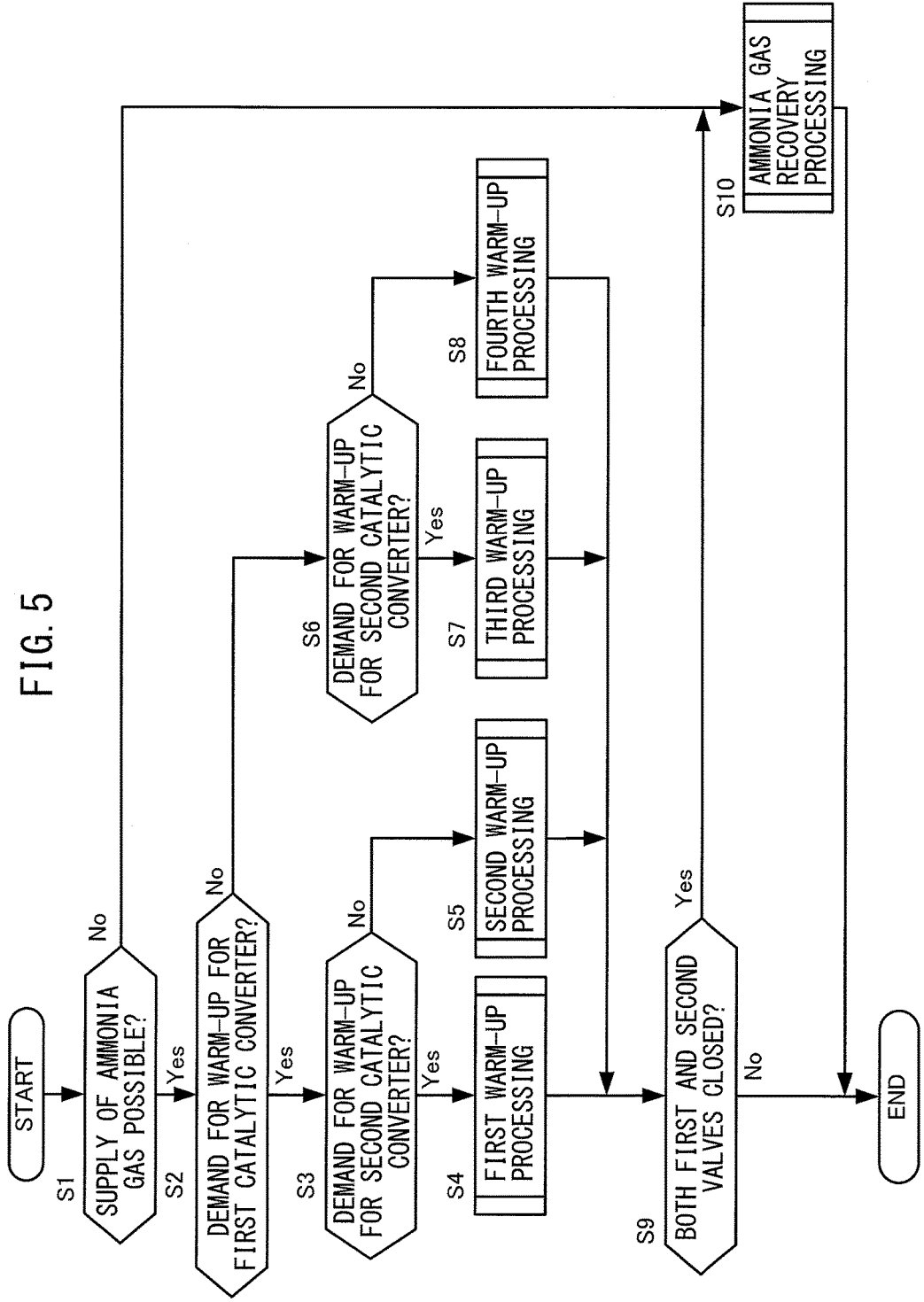
FIG. 5 is a flow chart regarding control of a chemical thermal storage device according to an embodiment of the present invention.

FIG. 5 is a flow chart regarding control of the chemical thermal storage device 70 according to the present embodiment. The electronic control unit 200 performs the present routine during operation of the internal combustion engine 100.

At step S1, the electronic control unit 200 judges if the state is one where ammonia gas can be supplied from the tank 71 to the first reactor 72 and second reactor 75, that is, if the ammonia gas for supply to the first reactor 72 and second reactor 75 is stored in the tank 71. Specifically, the electronic control unit 200 judges if the tank pressure is higher than the preset lower limit pressure P1. The lower limit pressure P1, for example, is the tank pressure where it can be judged that generally the maximum extent of ammonia gas has been supplied to the first reactor 72 and second reactor 75. In the present embodiment, a pressure value corresponding to 5% of the tank pressure at the reference temperature (for example, ordinary temperature) when the amount of storage of ammonia gas in the tank 71 becomes the full amount of storage (below, referred to as the "maximum tank pressure") is made the lower limit pressure P1.

The electronic control unit 200 judges the state is one where ammonia gas can be supplied from the tank 71 to the first reactor 72 and second reactor 75 if the tank pressure is higher than the lower limit pressure P1, then proceeds to the processing of step S2. On the other hand, the electronic control unit 200 judges that the state is one where ammonia gas cannot be supplied from the tank 71 to the first reactor 72 and second reactor 75 if the tank pressure is the lower limit pressure P1 or less, then proceeds to the processing of S10.

At step S2, the electronic control unit 200 judges if there is a demand for warm-up of the first catalytic converter 30, that is, there is a demand for activation of the oxidation catalyst. Specifically, the electronic control unit 200 judges if the first catalyst bed temperature is less than the preset first threshold value. In the present embodiment, the temperature enabling the oxidation catalyst to be sufficiently activated is made the first threshold value. Therefore, the first threshold value becomes a value of at least the activation temperature of the oxidation catalyst. The electronic control unit 200 judges that there is a demand for warm-up of the first catalytic converter 30 if the first catalyst bed temperature is less than the first threshold value, then proceeds to the processing of step S3. On the other hand, the electronic control unit 200 judges that there is no demand for warm-up of the first catalytic converter 30 if the first catalyst bed temperature is the first threshold value or more, then proceeds to the processing of S6.

At step S3, the electronic control unit 200 judges if there is a demand for warm-up of the second catalytic converter 50, that is, a demand for activation of the $NO_X$ selective reduction catalyst. Specifically, the electronic control unit 200 judges if the second catalyst bed temperature is less than the preset second threshold value. In the present embodiment, the $NO_X$ selective reduction catalyst can be made sufficient active. Further, the temperature enabling urea aqueous solution to be sufficiently hydrolyzed is made the second threshold value. Therefore, the second threshold value becomes the value of the temperature of the higher of the activation temperature of the $NO_X$ selective reduction catalyst and the hydrolysis temperature of the urea aqueous solution or becomes higher. In the present embodiment, the second threshold value is made a value smaller than the first threshold value, but the relationship of size of the second threshold value and the first threshold value is not particularly limited. The electronic control unit 200 judges there is a demand for warm-up of the second catalytic converter 50 if the second catalyst bed temperature is less than the second threshold value, then proceeds to the processing of step S4. On the other hand, the electronic control unit 200 judges there is no demand for warm-up of the second catalytic converter 50 if the second catalyst bed temperature is the second threshold value or more, then proceeds to the processing of step S5.

At step S4, the electronic control unit 200 performs first warm-up processing. The first warm-up processing is processing for determining how to operate the first valve 74 and second valve 77 when there are demands for warm-up for both the first catalytic converter 30 and second catalytic converter 50. Details of the first warm-up processing will be explained later with reference to FIG. 6.

At step S5, the electronic control unit 200 performs second warm-up processing. The second warm-up processing is processing for determining how to operate the first valve 74 and second valve 77 when there is only a demand for warm-up for the first catalytic converter 30. Details of the second warm-up processing will be explained later with reference to FIG. 7.

At step S6, the electronic control unit 200 judges if there is a demand for warm-up of the second catalytic converter 50 if there is no demand for warm-up of the first catalytic converter 30. Specifically, the electronic control unit 200, in the same way as the processing performed at step S3, judges if the second catalyst bed temperature is less than a preset second threshold value. The electronic control unit 200 judges that there is a demand for warm-up of the second catalytic converter 50 if the second catalyst bed temperature is less than the second threshold value, then proceeds to the processing of S7. On the other hand, the electronic control unit 200 judges that there is no demand for warm-up of the second catalytic converter 50 if the second catalyst bed temperature is the second threshold value or more, then proceeds to the processing of S8.

At step S7, the electronic control unit 200 performs third warm-up processing. The third warm-up processing is processing for determining how to operate the first valve 74 and second valve 77 when there is just a demand for warm-up for the second catalytic converter 50. Details of the third warm-up processing will be explained later with reference to FIG. 8.

At step S8, the electronic control unit 200 performs fourth warm-up processing. The fourth warm-up processing is processing for determining how to operate the first valve 74 and second valve 77 when there is no demand for warm-up to either of the first catalytic converter 30 and the second catalytic converter 50. Details of the fourth warm-up processing will be explained later with reference to FIG. 9.

At step S9, the electronic control unit 200 judges if both of the first valve 74 and second valve 77 have been closed as a result of the different warm-up processing. The electronic control unit 200 proceeds to the processing of step S10 so as to enable the ammonia gas supplied to the reactors 72, 75 to be recovered in accordance with need when both of the first valve 74 and second valve 77 have been closed, that is, when the first catalytic converter 30 and second catalytic converter 50 are not warmed up. On the other hand, the electronic control unit 200 ends the current processing if at least one of the first valve 74 and second valve 77 has been opened as a result of performing the different warm-up processings.

At step S10, the electronic control unit 200 performs ammonia gas recovery processing. The ammonia gas recovery processing is processing for recovering ammonia gas supplied to the first reactor 72 and second reactor 75 at the tank 71. Details of the ammonia gas recovery processing will be explained later with reference to FIG. 10.

Figure 6:
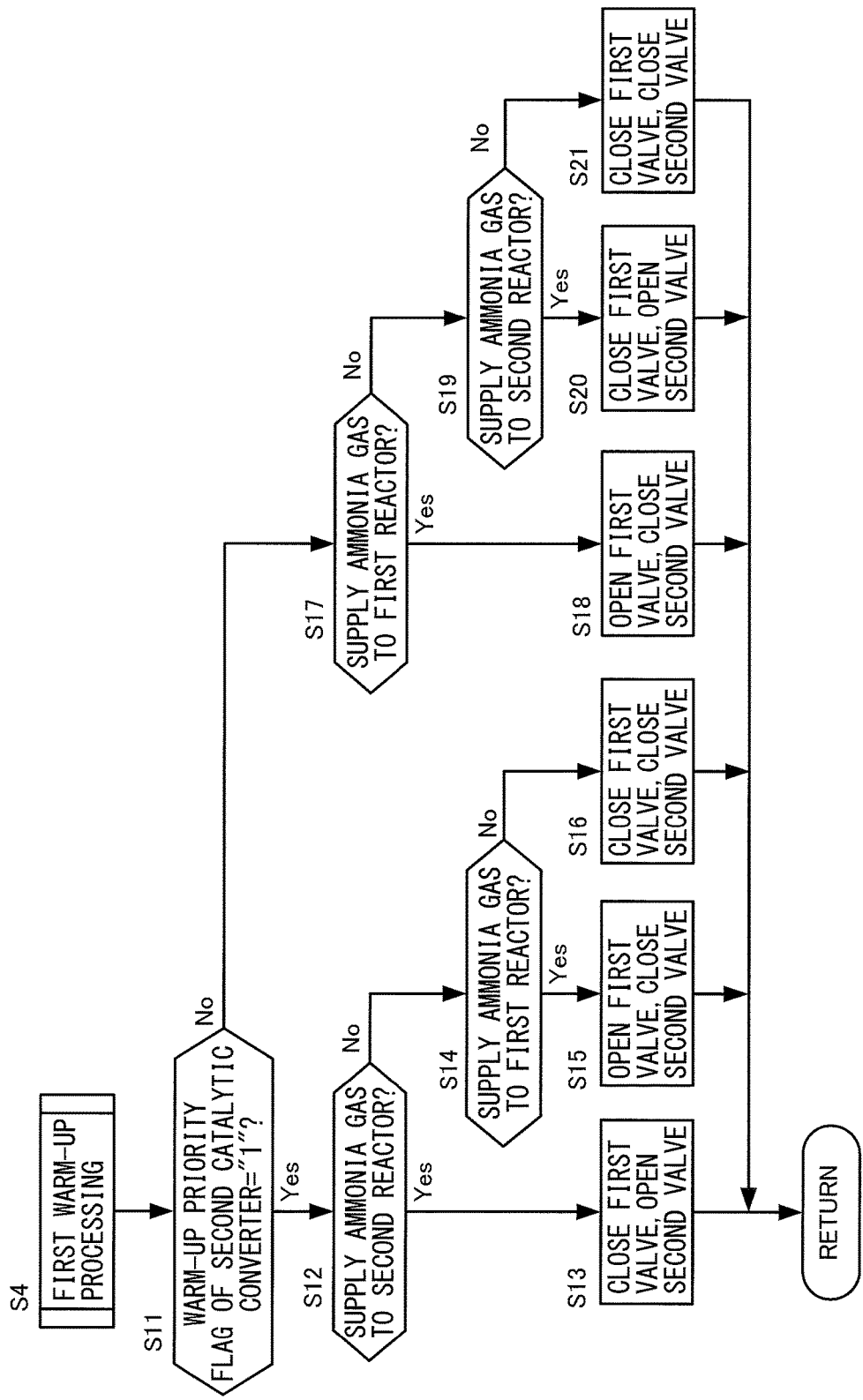
FIG. 6 is a flow chart regarding first warm-up processing.

FIG. 6 is a flow chart regarding first warm-up processing.

At step S11, the electronic control unit 200 judges if the warm-up priority flag of the second catalytic converter 50 has been set to "1". The warm-up priority flag of the second catalytic converter 50 is a flag set to "1" when there are demands for warm-up to both the first catalytic converter 30 and second catalytic converter 50 and when giving priority to warm-up of the second catalytic converter 50. Its initial value is set to "0". The warm-up priority flag of the second catalytic converter 50 is set by control for setting the warm-up priority flag separately performed from the present routine. This control for setting the warm-up priority flag will be explained later referring to FIG. 16.

The electronic control unit 200 proceeds to the processing of step S12 for preferentially warming up the second catalytic converter 50 if the warm-up priority flag of the second catalytic converter 50 is set to "1". On the other hand, the electronic control unit 200 proceeds to the processing of step S17 if the warm-up priority flag of the second catalytic converter 50 has been set to "0".

At step S12, the electronic control unit 200 judges whether to supply ammonia gas to the second reactor 75. Specifically, the electronic control unit 200 judges if the ammonia gas adsorption amount of the second chemical thermal storage medium 753 has reached the upper limit and judges if the downstream side exhaust temperature is the second threshold value or less.

Whether the ammonia gas adsorption amount of the second chemical thermal storage medium 753 has reached the upper limit is judged since heating is not possible even if supplying more ammonia gas since the ammonia gas adsorption amount has reached the upper limit. Note that, the ammonia gas adsorption amount of the second chemical thermal storage medium 753 is proportional to the amount of ammonia gas supplied from the tank 71 to the second reactor 75. Therefore, for example, if using the amount of drop of the tank pressure when supplying ammonia gas to the second reactor 75 and the amount of increase of the tank pressure when recovering ammonia gas from the second reactor 75 as the basis to calculate the ammonia gas adsorption amount of the second chemical thermal storage medium 753, it is possible to judge that the ammonia gas adsorption amount of the second chemical thermal storage medium 753 has reached the upper limit when the ammonia gas adsorption amount is a predetermined amount or more. Further, whether the downstream side exhaust temperature is the second threshold value or less is judged since if the downstream side exhaust temperature is higher than the second threshold value, the heat of exhaust can be used to warm up the second catalytic converter and there is no need to supply ammonia gas to the second reactor 75 to cause an exothermic reaction at the second reactor 75.

The electronic control unit 200 proceeds to the processing of step S13 if judging to supply ammonia gas to the second reactor 75. On the other hand, the electronic control unit 200 proceeds to the processing of step S14 if judging not to supply ammonia gas to the second reactor 75.

At step S13, the electronic control unit 200 closes the first valve 74 and opens the second valve 77 so as to preferentially supply ammonia gas to the second reactor 75.

At step S14, the electronic control unit 200 judges whether to supply ammonia gas to the first reactor 72 when it is not possible to preferentially supply ammonia gas to the second reactor 75. Specifically, the electronic control unit 200 judges if the ammonia gas adsorption amount of the first chemical thermal storage medium 723 has reached the upper limit and judges if the upstream side exhaust temperature is the first threshold value or less.

Whether the ammonia gas adsorption amount of the first chemical thermal storage medium 723 has reached the upper limit can be judged by a similar method to whether the ammonia gas adsorption amount of the second chemical thermal storage medium 753 has reached the upper limit explained above. Further, it is judged if the upstream side exhaust temperature is the first threshold value or less since if the upstream side exhaust temperature becomes higher than the first threshold value, the heat of exhaust can be used to warm up the first catalytic converter 30 and there is no need to supply ammonia gas to the first reactor 72 to cause an exothermic reaction at the first reactor 72.

The electronic control unit 200 proceeds to the processing of step S15 if judging to supply ammonia gas to the first reactor 72. On the other hand, the electronic control unit 200 proceeds to the processing of step S16 if judging not to supply ammonia gas to the first reactor 72.

At step S15, the electronic control unit 200 opens the first valve 74 and closes the second valve 77 so as to supply ammonia gas to the first reactor 72.

At step S16, the electronic control unit 200 closes both the first valve 74 and second valve 77 so as not to supply ammonia gas to both the first reactor 72 and second reactor 75.

At step S17, the electronic control unit 200 judges whether to supply ammonia gas to the first reactor 72. Specifically, the electronic control unit 200 performs processing similar to step S14. That is, it judges if the ammonia gas adsorption amount of the first chemical thermal storage medium 723 has reached the the upper limit and judges if the upstream side exhaust temperature is the first threshold value or less. The electronic control unit 200 proceeds to the processing of step S18 if judging to supply ammonia gas to the first reactor 72. On the other hand, the electronic control unit 200 proceeds to the processing of step S19 if judging not to supply ammonia gas to the first reactor 72.

At step S18, the electronic control unit 200 opens the first valve 74 and closes the second valve 77 so as to supply ammonia gas to the first reactor 72.

At step S19, the electronic control unit 200 judges whether to supply ammonia gas to the second reactor 75 if not supplying ammonia gas to the first reactor 72. Specifically, the electronic control unit 200 performs processing similar to step S12. That is, it judges if the ammonia gas adsorption amount of the second chemical thermal storage medium 753 has reached the upper limit and judges if the downstream side exhaust temperature is the second threshold value or less. The electronic control unit 200 proceeds to the processing of step S20 if judging to supply ammonia gas to the first reactor 72. On the other hand, the electronic control unit 200 proceeds to the processing of step S21 if judging not to supply ammonia gas to the second reactor 75.

At step S20, the electronic control unit 200 closes the first valve 74 and opens the second valve 77 so as to supply ammonia gas to the second reactor 75.

At step S21, the electronic control unit 200 closes both the first valve 74 and second valve 77 so as not to supply ammonia gas to both the first reactor 72 and second reactor 75.

Note that in the present embodiment, if there is a demand for warm-up for both of the first catalytic converter 30 and second catalytic converter 50, when the warm-up priority flag of the second catalytic converter 50 is set to "0" at step S11, the first catalytic converter 30 is first warmed up at steps S17, S18.

As opposed to this, for example, when the warm-up priority flag of the second catalytic converter 50 is set to "0" at step S11, it is possible to judge at step S17 whether to supply ammonia gas to both of the first reactor 72 and second reactor 75 and, in accordance with the results of judgment, simultaneously open the first valve 74 and second valve 77 to be able to simultaneously warm up the first catalytic converter 30 and second catalytic converter 50. Further, for example, it is possible to open just the first valve 74 then open the second valve 77 in the middle of warming up the first catalytic converter 30 and from the middle of that to simultaneously warm up the first catalytic converter 30 and second catalytic converter 50.

Figure 7:
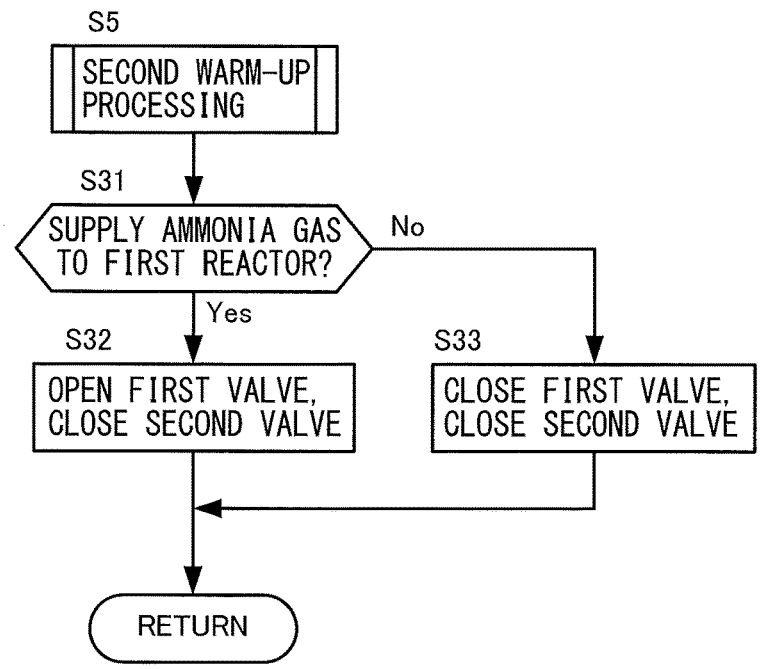
FIG. 7 is a flow chart regarding second warm-up processing.

FIG. 7 is a flow chart regarding the content of second warm-up processing.

At step S31, the electronic control unit 200 judges whether to supply ammonia gas to the first reactor 72. Specifically, the electronic control unit 200 judges if the ammonia gas adsorption amount of the first chemical thermal storage medium 723 has reached the upper limit and judges if the upstream side exhaust temperature is the first threshold value or less. The electronic control unit 200 proceeds to the processing of step S32 if judging to supply ammonia gas to the first reactor 72. On the other hand, the electronic control unit 200 proceeds to the processing of step S33 if judging not to supply ammonia gas to the first reactor 72.

At step S32, the electronic control unit 200 opens the first valve 74 and closes the second valve 77 so as to supply ammonia gas to the first reactor 72.

At step S33, the electronic control unit 200 closes the first valve 74 and second valve 77 since not supplying ammonia gas to the first reactor 72 and there is no demand for warm-up for the second catalytic converter 50.

Figure 8:
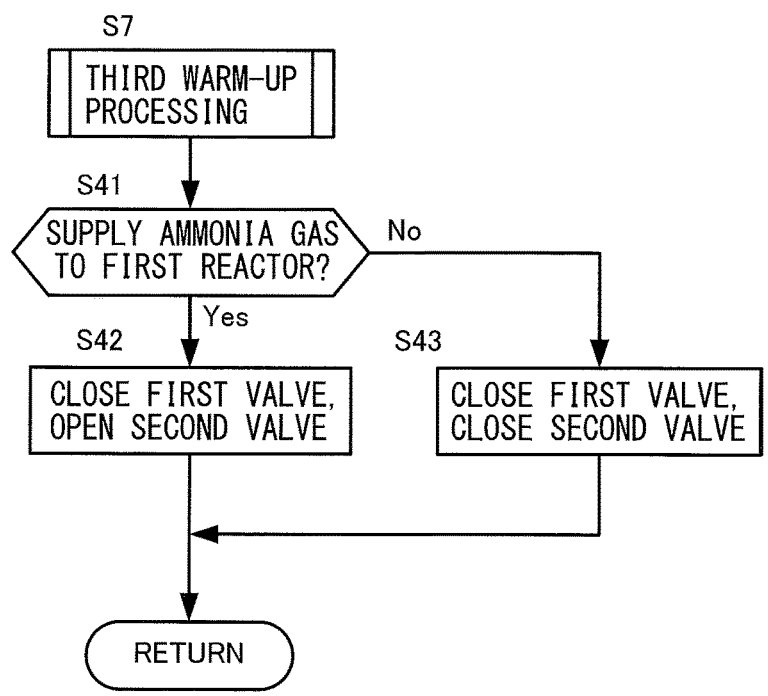
FIG. 8 is a flow chart regarding third warm-up processing.

FIG. 8 is a flow chart regarding the content of third warm-up processing.

At step S41, the electronic control unit 200 judges if to supply ammonia gas to the second reactor 75. Specifically, the electronic control unit 200 judges if the ammonia gas adsorption amount of the second chemical thermal storage medium 753 has reached the upper limit and judges if the downstream side exhaust temperature is the second threshold value or less. The electronic control unit 200 proceeds to the processing of step S42 if judging to supply ammonia gas to the second reactor 75. On the other hand, the electronic control unit 200 proceeds to the processing of step S43 if judging not to supply ammonia gas to the second reactor 75.

At step S42, the electronic control unit 200 closes the first valve 74 and opens the second valve 77 so as to supply ammonia gas to the second reactor 75.

At step S43, the electronic control unit 200 closes the first valve 74 and second valve 77 since not supplying ammonia gas to the second reactor 75 and there is no demand for warm-up for the first catalytic converter 30.

Figure 9:
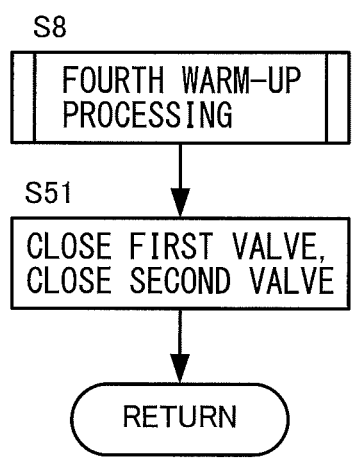
FIG. 9 is a flow chart regarding fourth warm-up processing.

FIG. 9 is a flow chart regarding fourth warm-up processing.

At step S51, the electronic control unit 200 closes both the first valve 74 and second valve 77 since there is no demand for warm-up for either of the first catalytic converter 30 and second catalytic converter 50.

Figure 10:
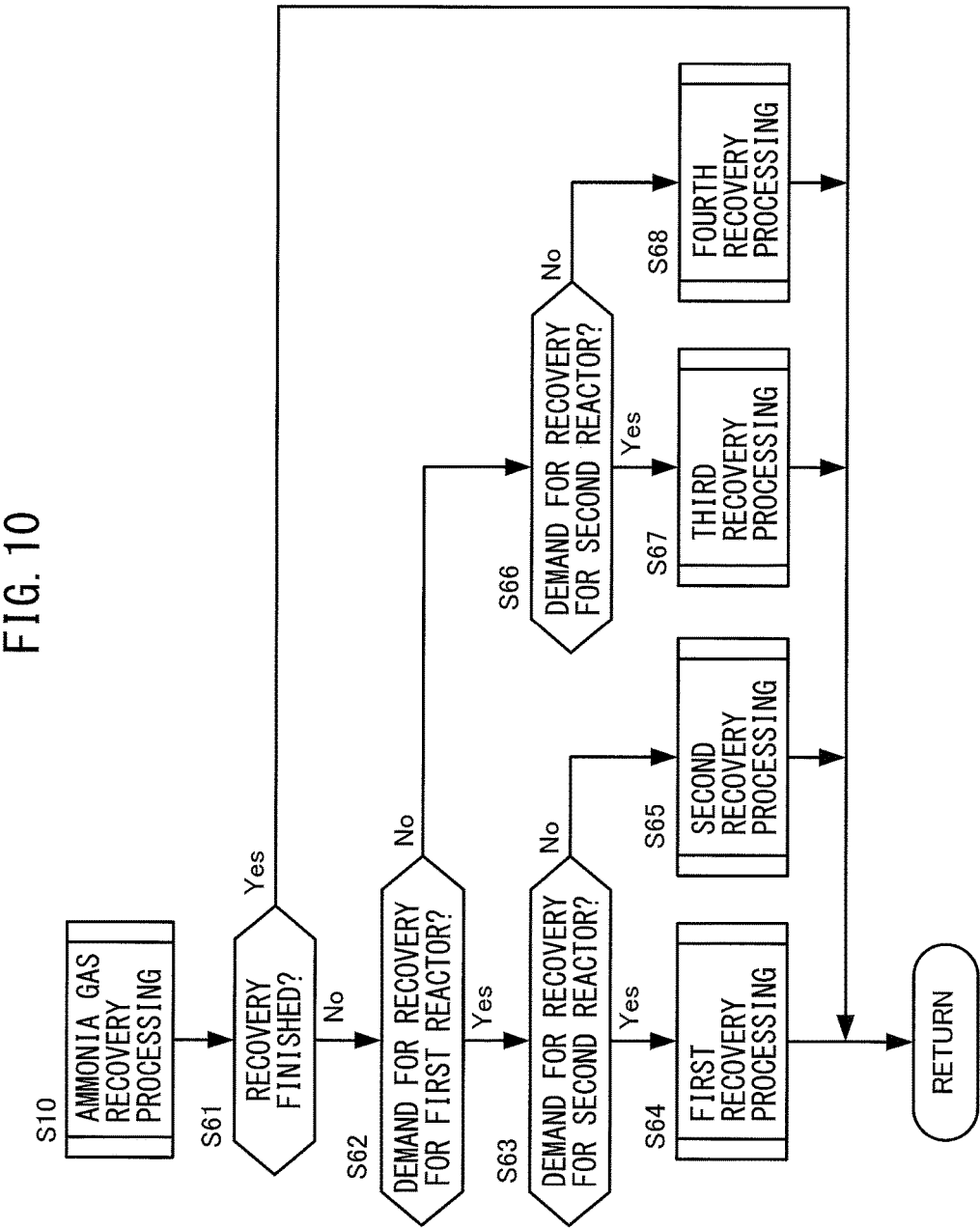
FIG. 10 is a flow chart regarding ammonia gas recovery processing.

FIG. 10 is a flow chart regarding ammonia gas recovery processing.

At step S61, the electronic control unit 200 judges if the ammonia supplied to one or both of the first reactor 72 and second reactor 75 has finished being recovered. Specifically, the electronic control unit 200 judges if the tank pressure is a preset upper limit pressure P2 or more. The upper limit pressure P2 is a tank pressure enabling judgment that the amount of storage of ammonia gas in the tank 71 is generally the full amount of storage. In the present embodiment, a pressure value corresponding to 95% of the maximum tank pressure is made the upper limit pressure P2.

The electronic control unit 200 judges that the ammonia gas has finished being recovered if the tank pressure is the upper limit pressure P2 or more then ends the ammonia gas recovery processing. On the other hand, the electronic control unit 200 judges that the ammonia gas has not yet finished being recovered if the tank pressure is less than the upper limit pressure P2, then proceeds to the processing of S62.

At step S62, the electronic control unit 200 judges if there is a demand for recovery of ammonia gas for the first reactor 72, that is, if the ammonia gas supplied to the first reactor 72 has not yet finished being recovered. Specifically, the electronic control unit 200 judges that the ammonia gas adsorption amount of the first chemical thermal storage medium 723 is greater than a predetermined first threshold value close to 0. Whether the ammonia gas adsorption amount of the first chemical thermal storage medium 723 is greater than the first threshold value, as explained above, for example, can be judged by using the amount of drop of the tank pressure when supplying ammonia gas to the first reactor 72 and the amount of increase of tank pressure when recovering ammonia gas from the first reactor 72 as the basis to calculate the ammonia gas adsorption amount of the first chemical thermal storage medium 723 at any time. The electronic control unit 200 judges there is a demand for recovery of ammonia gas for the first reactor if the ammonia gas adsorption amount of the first chemical thermal storage medium 723 is greater than the first threshold value, then proceeds to the processing of S63. On the other hand, the electronic control unit 200 judges that there is no demand for recovery of ammonia for the first reactor 72 if the ammonia gas adsorption amount of the first chemical thermal storage medium 723 is the first threshold value or less, then proceeds to the processing of S66. Note that, in judging if the ammonia gas has not yet finished being recovered in this way, it is judged if the ammonia gas adsorption amount is greater than a first threshold value close to 0 since sometimes it is difficult to completely recover the supplied ammonia gas.

At step S63, the electronic control unit 200 judges if there is a demand for recovery of ammonia gas for the second reactor 75, that is, if the ammonia gas supplied to the second reactor 75 has not yet finished being recovered. Specifically, the electronic control unit 200 judges that there is a demand for recovery of ammonia gas for the second reactor 75 if the ammonia gas adsorption amount of the second chemical thermal storage medium 753 is greater than a predetermined second threshold value closer to 0, then proceeds to the processing of S64. On the other hand, the electronic control unit 200 judges there is no demand for recovery of ammonia gas for the second reactor 75 if the ammonia gas adsorption amount of the second chemical thermal storage medium 753 is the second threshold value or less, then proceeds to the processing of S65. Note that the total of the first threshold value and the second threshold value is set to become an amount of ammonia gas corresponding to 5% of the maximum tank pressure. In the present embodiment, the first threshold value and the second threshold value are made the same values, but may be made different values in accordance with need.

At step S64, the electronic control unit 200 performs the first recovery processing. The first recovery processing is processing for determining how to operate the first valve 74 and second valve 77 if there is a demand for recovery of ammonia gas for both of the first reactor 72 and second reactor 75. Details of the first recovery processing will be explained later with reference to FIG. 11.

At step S65, the electronic control unit 200 performs the second recovery processing. The second recovery processing is processing for determining how to operate the first valve 74 and second valve 77 if there is a demand for recovery of ammonia gas only for the first reactor 72. Details of the second recovery processing will be explained later with reference to FIG. 12.

At step S66, the electronic control unit 200 judges that there is a demand for recovery of the ammonia gas to the second reactor 75 when there is no demand for recovery of ammonia gas to the first reactor 72. Specifically, the electronic control unit 200 performs processing similar to step S63, judges that there is a demand for recovery of ammonia gas for the second reactor 75 if the ammonia gas adsorption amount of the second chemical thermal storage medium 753 is greater than a predetermined second threshold value close to 0, then proceeds to the processing of S67. On the other hand, the electronic control unit 200 judges that there is no demand for recovery of ammonia gas for the second reactor 75 if the ammonia gas adsorption amount of the second chemical thermal storage medium 753 is the second threshold value or less, then proceeds to the processing of S68.

At step S67, the electronic control unit 200 performs third recovery processing. The third recovery processing is processing for determining how to operate the first valve 74 and second valve 77 when there is a demand for recovery of ammonia gas only for the second reactor 75. Details of the third recovery processing will be explained later referring to FIG. 1.

At step S68, the electronic control unit 200 performs fourth recovery processing. The fourth recovery processing is processing determining how to operate the first valve 74 and second valve 77 when there is no demand for recovery of ammonia gas for either the first reactor 72 and second reactor 75. Details of the fourth recovery processing will be explained later with reference to FIG. 14.

Figure 11:
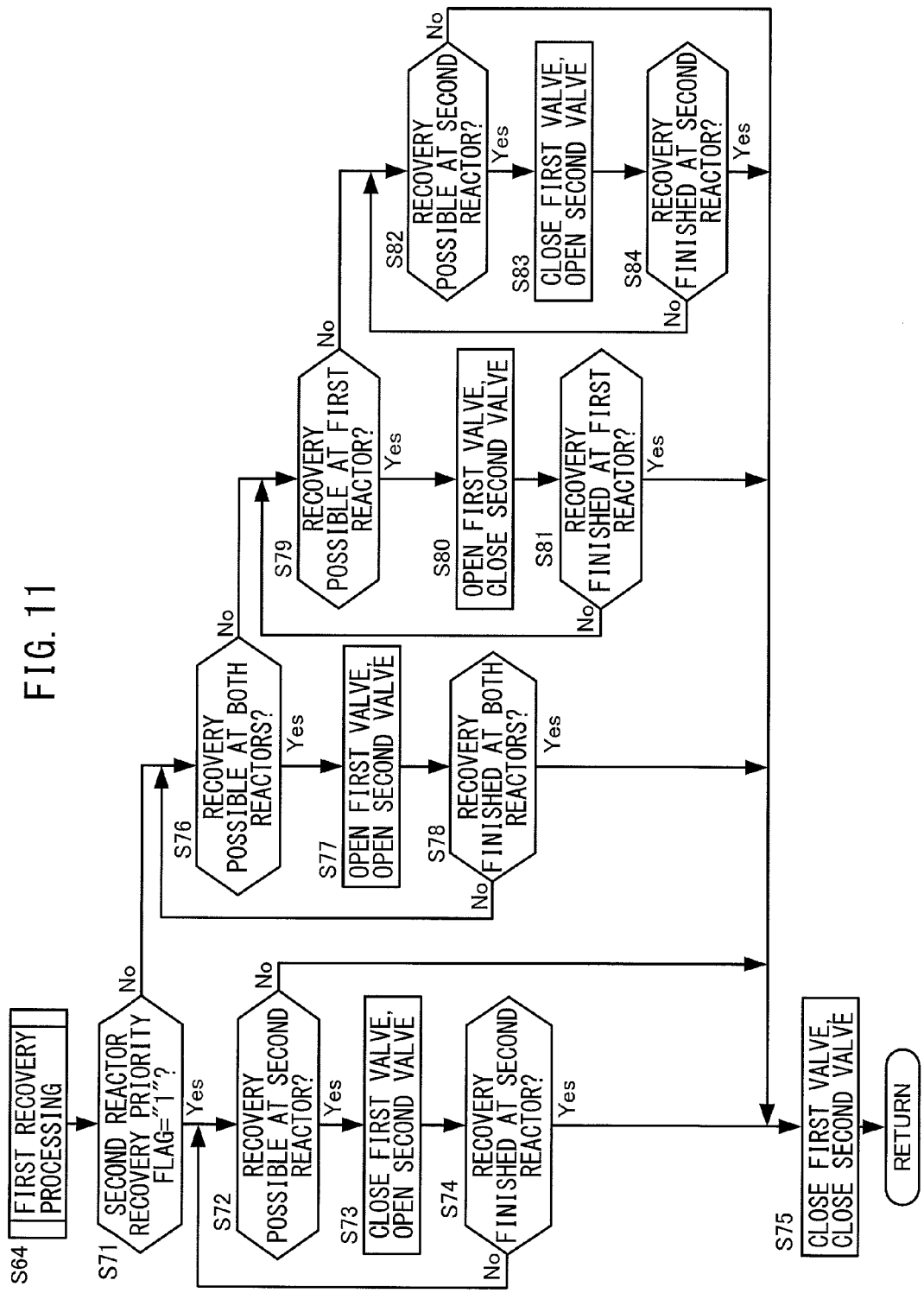
FIG. 11 is a flow chart regarding first recovery processing.

FIG. 11 is a flow chart regarding first recovery processing.

At step S71, the electronic control unit 200 judges if the recovery priority flag of the second reactor 75 has been set to "1". The recovery priority flag of the second reactor 75 is a flag set to "1" when there are demands for recovery of ammonia gas for both the first reactor 72 and second reactor 75 and when giving priority to recovery of ammonia gas supplied to the second reactor 75. Its initial value is set to "0". The recovery priority flag of the second reactor 75 is set by control for setting the recovery priority flag separately performed from the present routine. This control for setting the recovery priority flag will be explained later referring to FIG. 16.

The electronic control unit 200 proceeds to the processing of step S72 if the recovery priority flag of the second reactor 75 is set to "1". On the other hand, the electronic control unit 200 proceeds to the processing of step S76 if the recovery priority flag of the second reactor 75 is set to "0".

At step S72, the electronic control unit 200 judges if the state is one where ammonia gas supplied to the second reactor 75 can be recovered at the tank 71. Specifically, the electronic control unit 200 judges if the downstream side exhaust temperature has become the low temperature side recovery temperature or more. This is because when there are demands for recovery of ammonia gas for both the first reactor 72 and second reactor 75, the state becomes one where ammonia is supplied to both reactors and the tank pressure becomes low, so if the downstream side exhaust temperature becomes the low temperature side recovery temperature or more, a reaction (endothermic reaction) occurs where ammonia gas is desorbed from the second chemical thermal storage medium 753 in the second reaction chamber 754.

The electronic control unit 200 judges that the state is one where the ammonia gas supplied to the second reactor 75 can be recovered at the tank 71 if the downstream side exhaust temperature is the low temperature side recovery temperature or more, then proceeds to the processing of S73. On the other hand, the electronic control unit 200 judges that the state is one where the ammonia gas supplied to the second reactor 75 can be recovered at the tank 71 if the downstream side exhaust temperature is less than the low temperature side recovery temperature, then proceeds to the processing of S75.

At step S73, the electronic control unit 200 closes the first valve 74 and opens the second valve 77. Due to this, a reaction occurs where ammonia gas is desorbed from the second chemical thermal storage medium 753 in the second reaction chamber 754, the ammonia gas inside the second reaction chamber 754 moves to the tank 71, and the tank pressure gradually rises until basically the tank pressure and second heater pressure match.

At step S74, the electronic control unit 200 judges if the ammonia gas supplied to the second reactor 75 has finished being recovered. Specifically, the electronic control unit 200 judges if the tank pressure has become the second heater pressure or more. The electronic control unit 200 judges that the ammonia gas supplied to the second reactor 75 has not finished being recovered if the tank pressure is less than the second heater pressure, then returns to the processing of step S72. Due to this, if the state is one where the ammonia gas supplied to the second reactor 75 can be recovered at the tank 71, the electronic control unit 200 continues to recover ammonia gas in the state where the second valve 77 is opened while the first valve 74 remains closed. On the other hand, the electronic control unit 200 judges that the ammonia gas supplied to the second reactor 75 has finished being recovered if the tank pressure is the second heater pressure or more, then proceeds to the processing of step S75.

At step S75, the electronic control unit 200 closes both of the first valve 74 and second valve 77.

At step S76, the electronic control unit 200 judges if the state is one where the ammonia gas supplied to both the first reactor 72 and second reactor 75 can simultaneously be recovered in the tank 71. Specifically, the electronic control unit 200 judges if the upstream side exhaust temperature and downstream side exhaust temperature are respectively the intermediate recovery temperature or more. This is because when the state is one where ammonia gas is supplied to both reactors and the tank pressure becomes low, if the upstream side exhaust temperature and downstream side exhaust temperature become the intermediate recovery temperature or more, reactions occur where ammonia gas is desorbed from the chemical thermal storage media 723, 753 in the reaction chambers 724, 754.

The electronic control unit 200 judges the state is one where the ammonia gas supplied to both the first reactor 72 and second reactor 75 can simultaneously be recovered in the tank 71 if the upstream side exhaust temperature and downstream side exhaust temperature are respectively the intermediate recovery temperature or more, then proceeds to the processing of step S77. On the other hand, the electronic control unit 200 judges that the state is not one where the ammonia gas supplied to both the first reactor 72 and second reactor 75 can simultaneously be recovered in the tank 71 if at least one of the upstream side exhaust temperature and downstream side exhaust temperature is less than the intermediate recovery temperature, then proceeds to the processing of S79.

At step S77, the electronic control unit 200 opens both of the first valve 74 and second valve 77. Due to this, reactions occur where ammonia gas is desorbed from the chemical thermal storage media 723, 753 in the reaction chambers 724, 754, the ammonia gas in the reaction chambers 724, 754 moves to the tank 71, and the tank pressure gradually rises until basically the tank pressure and the first heater pressure and second heater pressure become equal.

At step S78, the electronic control unit 200 judges if the ammonia gas supplied to both the first reactor 72 and second reactor 75 has finished being recovered. Specifically, the electronic control unit 200 judges if the tank pressure is the first heater pressure or more and the second heater pressure or more. The electronic control unit 200 judges that the ammonia gas supplied to both the first reactor 72 and second reactor 75 has not finished being recovered if the tank pressure is less than the first heater pressure or less than the second heater pressure, then returns to the processing of step S76. Due to this, if the state is one where the ammonia gas supplied to both the first reactor 72 and second reactor 75 can simultaneously be recovered in the tank 71, the electronic control unit 200 continues to recover ammonia gas in the state opening both the first valve 74 and second valve 77. On the other hand, the electronic control unit 200 judges that the ammonia gas supplied to both the first reactor 72 and second reactor 75 has finished being recovered if tank pressure is the first heater pressure or more and the second heater pressure or more, then proceeds to the processing of step S75.

At step S79, the electronic control unit 200 judges if the state is one where the ammonia gas supplied to the first reactor 72 can be recovered in the tank 71. Specifically, the electronic control unit 200 judges if the upstream side exhaust temperature has become the low temperature side recovery temperature or more. This is because if there are demands for recovery of ammonia gas for both the first reactor 72 and second reactor 75, the state becomes one where ammonia gas is supplied to both reactors and the tank pressure becomes low, so if the upstream side exhaust temperature becomes a low temperature side recovery temperature or more, a reaction occurs where ammonia gas is desorbed from the chemical thermal storage medium in the first reaction chamber 724.

The electronic control unit 200 judges that the situation is one where the ammonia gas supplied to the first reactor 72 can be recovered at the tank 71 if the upstream side exhaust temperature is the low temperature side recovery temperature or more, then the routine proceeds to the processing of S80. On the other hand, the electronic control unit 200 judges that the situation is not one where the ammonia gas supplied to the first reactor 72 can be recovered at the tank 71 if the upstream side exhaust temperature is lower than the low temperature side recovery temperature, then proceeds to the processing of S82.

At step S80, the electronic control unit 200 opens the first valve 74 and closes the second valve 77. Due to this, a reaction occurs where ammonia gas is desorbed from the first chemical thermal storage medium 723 in the first reaction chamber 724, the ammonia gas in the first reaction chamber 724 moves to the tank 71, and the tank pressure gradually rises until basically the tank pressure and the first heater pressure match.

At step S81, the electronic control unit 200 judges if the ammonia gas supplied to the first reactor 72 has finished being recovered. Specifically, the electronic control unit 200 judges if tank pressure is the first heater pressure or more. The electronic control unit 200 judges that the ammonia gas supplied to the first reactor 72 has not finished being recovered if the tank pressure is less than the first heater pressure, then returns to the processing of step S79. Due to this, if the state is one where the ammonia gas supplied to the first reactor 72 can be recovered in the tank 71, the electronic control unit 200 continues recovering the ammonia gas in the state where the first valve 74 is opened while the second valve 77 remains closed. On the other hand, the electronic control unit 200 judges that the ammonia gas supplied to the first reactor 72 has finished being recovered if the tank pressure is the first heater pressure or more, then proceeds to the processing of step S75.

At step S82, the electronic control unit 200 judges if the state is one where the ammonia gas supplied to the second reactor 75 can be recovered at the tank 71 when the ammonia gas supplied to the first reactor 72 cannot be recovered at the tank 71. Specifically, the electronic control unit 200, in the same way as the processing of step S72, judges if the downstream side exhaust temperature has become the low temperature side recovery temperature or more. The electronic control unit 200 judges that the state is one where ammonia gas supplied to the second reactor 75 can be recovered at the tank 71 if the downstream side exhaust temperature is the low temperature side recovery temperature or more, then proceeds to the processing of S83.

On the other hand, the electronic control unit 200 judges that the state is not one where the ammonia gas supplied to the second reactor 75 can be recovered at the tank 71 if the downstream side exhaust temperature is less than the low temperature side recovery temperature, then proceeds to the processing of S75.

At step S83, the electronic control unit 200 closes the first valve 74 and opens the second valve 77. Due to this, a reaction occurs where ammonia gas is desorbed from the second chemical thermal storage medium 753 in the second reaction chamber 754, the ammonia gas in the second reaction chamber 754 moves to the tank 71, and the tank pressure gradually rises until basically the tank pressure and the second heater pressure match.

At step S84, the electronic control unit 200 judges if the ammonia gas supplied to the second reactor 75 has finished being recovered. Specifically, the electronic control unit 200 judges if the tank pressure has become the second heater pressure or more. The electronic control unit 200 judges that the ammonia gas supplied to the second reactor 75 has not finished being recovered if the tank pressure is less than the second heater pressure, then returns to the processing of step S82. Due to this, if the state is one where the ammonia gas supplied to the second reactor 75 can be recovered at the tank 71, the electronic control unit 200 continues to recover the ammonia gas in the state where the second valve 77 is opened while the first valve 74 remains closed. On the other hand, the electronic control unit 200 judges that the ammonia gas supplied to the second reactor 75 has finished being recovered if the tank pressure is the second heater pressure or more, then proceeds to the processing of step S75.

Figure 12:
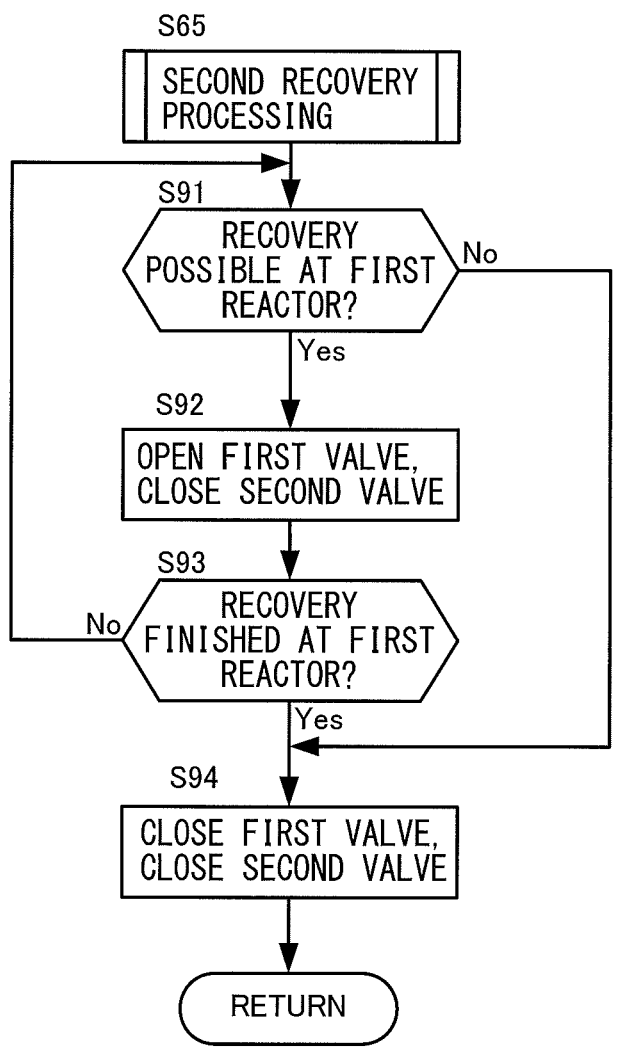
FIG. 12 is a flow chart regarding second recovery processing.

FIG. 12 is a flow chart regarding second recovery processing.

At step S91, the electronic control unit 200 judges if the state is one where the ammonia gas supplied to the first reactor 72 can be recovered at the tank 71. Specifically, the electronic control unit 200 judges if the upstream side exhaust temperature is the high temperature side recovery temperature or more. This is because if there is a demand for recovery of ammonia gas just for the first reactor 72, the state becomes one where the tank pressure becomes higher than the case where there are demands for recovery of ammonia gas for both the first reactor 72 and second reactor 75, so if the upstream side exhaust temperature does not become a high temperature side exhaust temperature higher than the low temperature side exhaust temperature or does not become more, a reaction does not occur where ammonia gas is desorbed from the chemical thermal storage medium in the first reaction chamber 724.

The electronic control unit 200 judges that the state is one where the ammonia gas supplied to the first reactor 72 can be recovered at the tank 71 if the upstream side exhaust temperature is the high temperature side recovery temperature or more, then proceeds to the processing of S92. On the other hand, the electronic control unit 200 judges the state is not one where the ammonia gas supplied to the first reactor 72 can be recovered at the tank 71 if the upstream side exhaust temperature is less than the high temperature side recovery temperature, then proceeds to the processing of S94.

At step S92, the electronic control unit 200 opens the first valve 74 and closes the second valve 77. Due to this, a reaction occurs where ammonia gas is desorbed from the first chemical thermal storage medium 723 in the first reaction chamber 724, the ammonia gas in the first reaction chamber 724 moves to the tank 71, and the tank pressure gradually rises until basically the tank pressure and the first heater pressure match.

At step S93, the electronic control unit 200 judges if the ammonia gas supplied to the first reactor 72 has finished being recovered. Specifically, the electronic control unit 200 judges if the tank pressure is the first heater pressure or more. The electronic control unit 200 judges the ammonia gas supplied to the first reactor 72 has not finished being recovered if the tank pressure is less than the first heater pressure, then returns to the processing of step S91. Due to this, if the state is one where the ammonia gas supplied to the first reactor 72 can be recovered at the tank 71, the electronic control unit 200 continues to recover ammonia gas in the state where the first valve 74 is opened while leaving the second valve 77 closed. On the other hand, the electronic control unit 200 judges that the ammonia gas supplied to the first reactor 72 has finished being recovered if the tank pressure is the first heater pressure or more, then proceeds to the processing of step S94.

At step S94, the electronic control unit 200 closes both of the first valve 74 and second valve 77.

Figure 13:
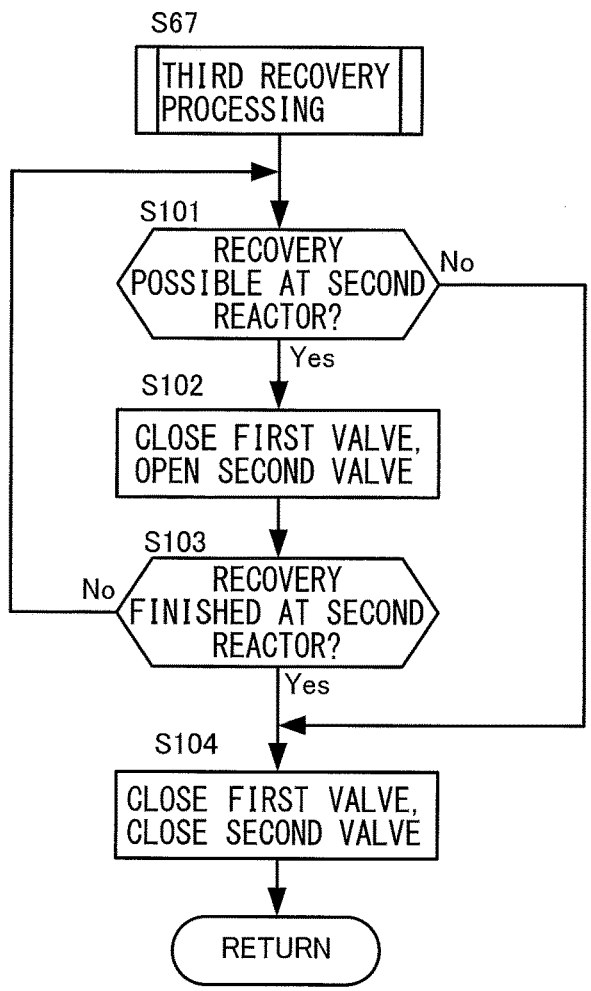
FIG. 13 is a flow chart regarding third recovery processing.

FIG. 13 is a flow chart regarding third recovery processing.

At step S101, the electronic control unit 200 judges if the state is one where ammonia gas supplied to the second reactor 75 can be recovered at the tank 71. Specifically, the electronic control unit 200 judges if the downstream side exhaust temperature is the high temperature side recovery temperature or more. This is because if there is a demand for recovery of ammonia gas just for the second reactor 75, the tank pressure becomes higher than the case where there is a demand for recovery of ammonia gas for both the first reactor 72 and second reactor 75, so if the downstream side exhaust temperature does not become the high temperature side exhaust temperature or more, no reaction will occur where ammonia gas is desorbed from the second chemical thermal storage medium 753 in the second reaction chamber 754.

The electronic control unit 200 judges that the state is one where the ammonia gas supplied to the second reactor 75 can be recovered at the tank 71 if the downstream side exhaust temperature is the high temperature side recovery temperature or more, then proceeds to the processing of S102. On the other hand, the electronic control unit 200 judges that the state is not one where the ammonia gas supplied to the first reactor 72 can be recovered at the tank 71 if the downstream side exhaust temperature is less than the high temperature side recovery temperature, then proceeds to the processing of S104.

At step S102, the electronic control unit 200 closes the first valve 74 and opens the second valve 77. Due to this, a reaction occurs where ammonia gas is desorbed from the second chemical thermal storage medium 753 in the second reaction chamber 754, the ammonia gas inside the second reaction chamber 754 moves to the tank 71, and the tank pressure gradually rises until basically the tank pressure and the second heater pressure match.

At step S103, the electronic control unit 200 judges if the ammonia gas supplied to the second reactor 75 has finished being recovered. Specifically, the electronic control unit 200 judges if the tank pressure has become the second heater pressure or more. The electronic control unit 200 judges that the ammonia gas supplied to the second reactor 75 has not finished being recovered if the tank pressure is less than the second heater pressure, then returns to the processing of step S101. Due to this, if the state is one where ammonia gas supplied to the second reactor 75 can be recovered at the tank 71, the electronic control unit 200 continues to recover ammonia gas in the state opening the second valve 77 while leaving the first valve 74 closed. On the other hand, the electronic control unit 200 judges that the ammonia gas supplied to the second reactor 75 has finished being recovered if the tank pressure is the second heater pressure or more, then proceeds to the processing of step S104.

At step S104, the electronic control unit 200 closes both of the first valve 74 and second valve 77.

Figure 14:
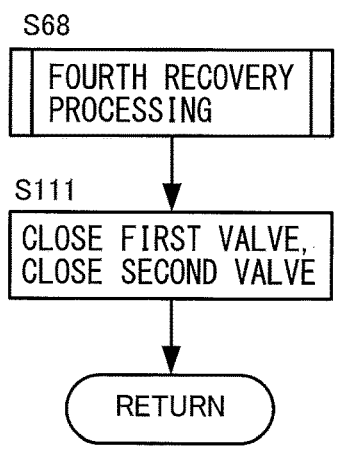
FIG. 14 is a flow chart regarding fourth recovery processing.

FIG. 14 is a flow chart regarding fourth recovery processing.

At step S111, the electronic control unit 200 closes both the first valve 74 and second valve 77 since there is no demand for recovery of ammonia gas for either of the first reactor 72 and second reactor 75.

Figure 15:
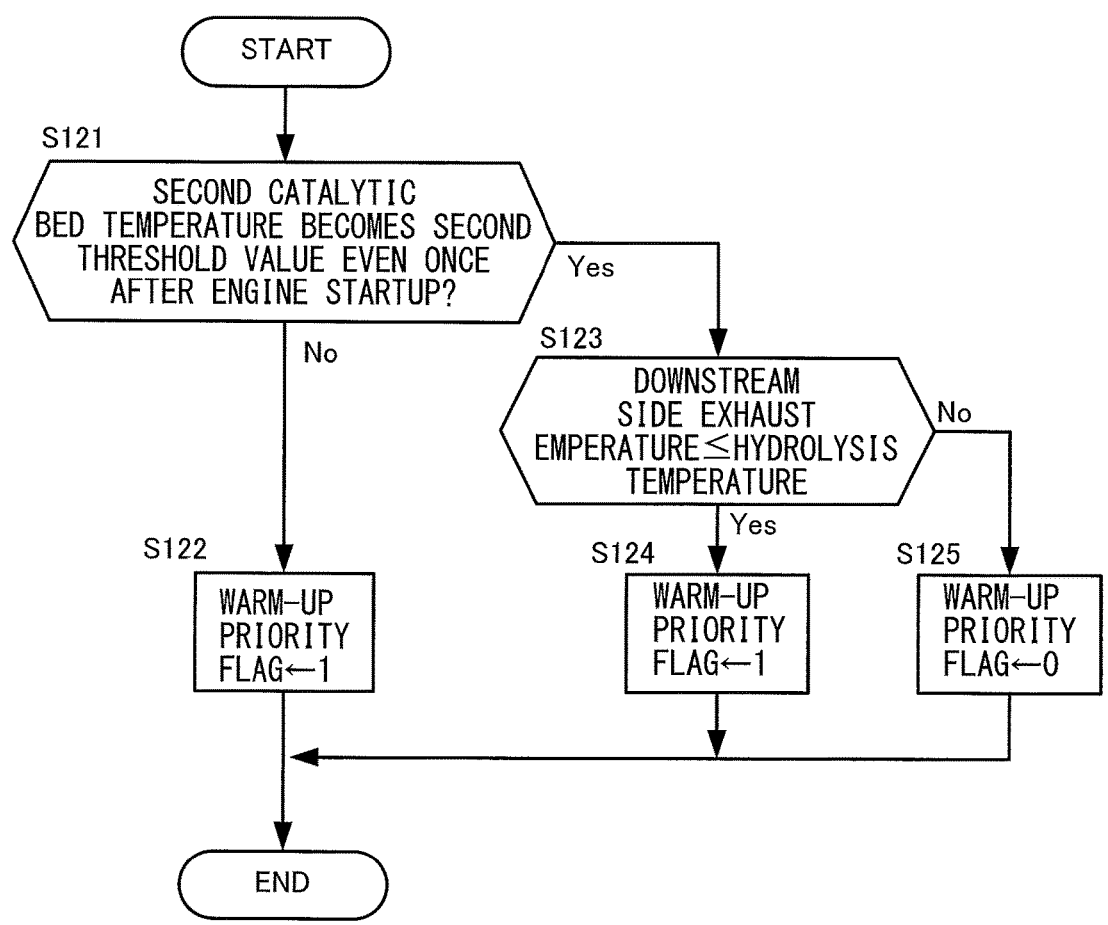
FIG. 15 is a flow chart regarding control for setting a warm-up priority flag of a second catalytic converter.

FIG. 15 is a flow chart regarding control for setting the warm-up priority flag of the second catalytic converter 50. The electronic control unit 200 repeatedly performs this routine during operation of the internal combustion engine.

At step S121, the electronic control unit 200 judges if the second catalyst bed temperature has become the second threshold value or more even once after engine start. The electronic control unit 200 proceeds to the processing of step S122 if the second catalyst bed temperature has not become the second threshold value or more even once after engine start. On the other hand, the electronic control unit 200 proceeds to the processing of step S123 if the second catalyst bed temperature has become the second threshold value or more even once after engine start.

At step S122, the electronic control unit 200 sets the warm-up priority flag of the second catalytic converter 50 at "1" for making the second catalyst bed temperature the hydrolysis temperature or more quickly after engine start.

At step S123, the electronic control unit 200 judges if the downstream side exhaust temperature has become the hydrolysis temperature or less. This judgment is made for the following reason. That is, when the routine proceeds to step S123, the second catalyst bed temperature becomes the second threshold value or more once after engine start, so basically hydrolysis of the urea aqueous solution becomes possible in the second catalytic converter 50. However, if the downstream side exhaust temperature ends up falling to the hydrolysis temperature, there is a possibility that the second catalyst bed temperature will also gradually fall and the urea aqueous solution will no longer be able to be sufficiently hydrolyzed. The electronic control unit 200 proceeds to the processing of step S124 if the downstream side exhaust temperature is the hydrolysis temperature or less and proceeds to the processing of step S125 if the downstream side exhaust temperature is higher than the hydrolysis temperature.

At step S124, the electronic control unit 200 sets the warm-up priority flag of the second catalytic converter 50 at "1".

At step S125, the electronic control unit 200 returns the warm-up priority flag of the second catalytic converter 50 to "0".

Figure 16:
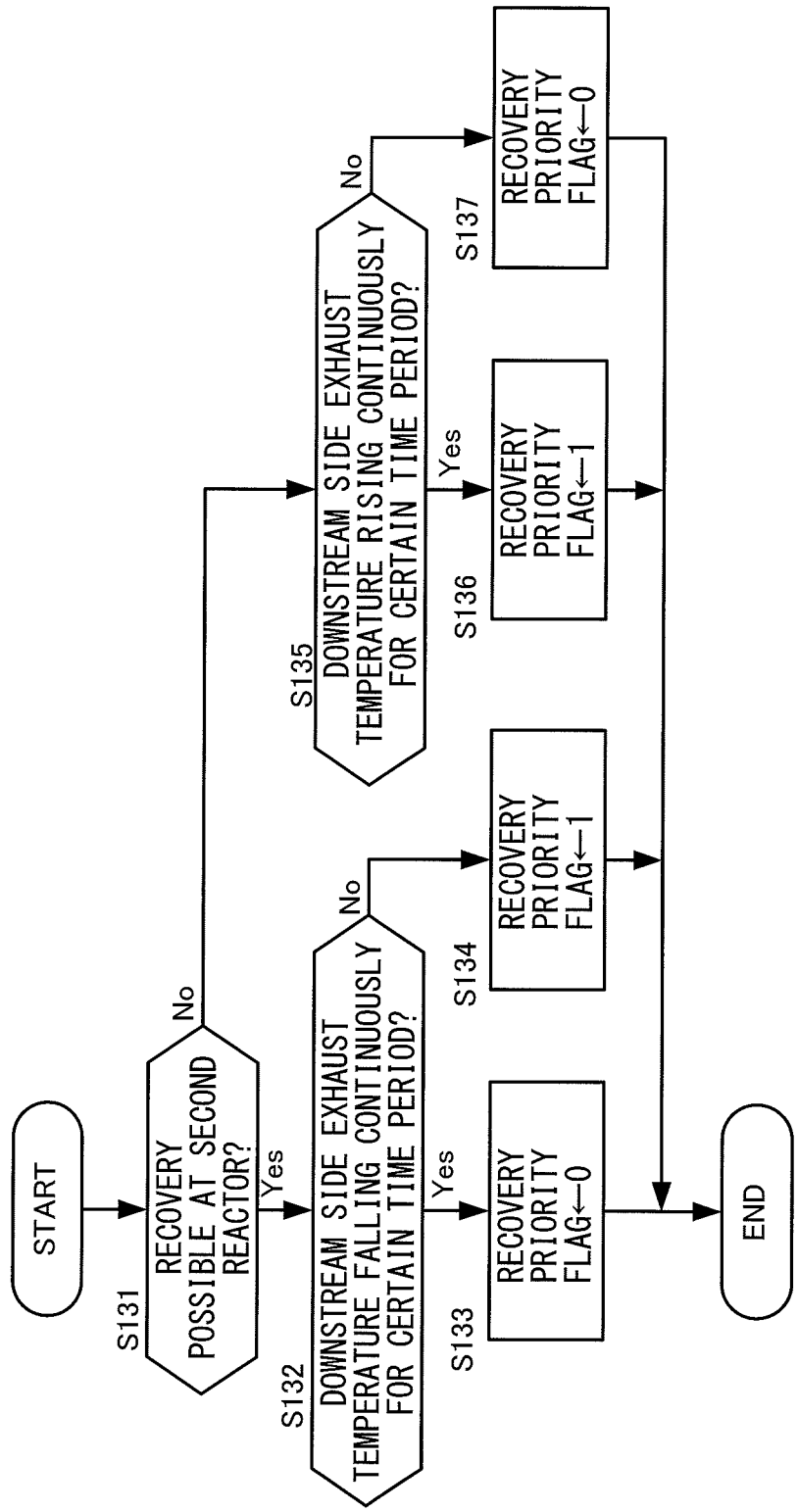
FIG. 16 is a flow chart regarding control for setting a recovery priority flag of a second reactor.

FIG. 16 is a flow chart regarding control for setting the recovery priority flag of the second reactor 75. The electronic control unit 200 repeatedly performs this routine during operation of the internal combustion engine.

At step S131, the electronic control unit 200 judges if the state is one where ammonia gas supplied to the second reactor 75 can be recovered at the tank 71. Specifically, the electronic control unit 200 judges if the downstream side exhaust temperature is the low temperature side recovery temperature or more. The electronic control unit 200 judges that the state is one where ammonia gas supplied to the second reactor 75 can be recovered at the tank 71 if the downstream side exhaust temperature is the low temperature side recovery temperature or more, then proceeds to the processing of S132. On the other hand, the electronic control unit 200 judges the state is not one where the ammonia gas supplied to the second reactor 75 can be recovered at the tank 71 if the downstream side exhaust temperature is less than the low temperature side recovery temperature, then proceeds to the processing of S135.

At step S132, the electronic control unit 200 judges if the downstream side exhaust temperature has continued to fall for a certain time. The electronic control unit 200 proceeds to the processing of step S133 if the downstream side exhaust temperature has continued to fall for a certain time, then sets the recovery priority flag of the second reactor 75 to "0". On the other hand, the electronic control unit 200 proceeds to the processing of step S134 if the downstream side exhaust temperature has continuously fallen for a certain time, then sets the recovery priority flag of the second reactor 75 to "1".

The recovery priority flag of the second reactor 75 is set to "0" when, in this way, the downstream side exhaust temperature has continued to fall for a certain time for the following reason. That is, the time when the downstream side exhaust temperature has continued to fall for a certain time is basically the time when the temperature of the exhaust discharged from the engine body 1 has continued to fall. After this as well, the temperature of the exhaust discharged from the engine body 1 is predicted to fall. For this reason, when the downstream side exhaust temperature has continued to fall for a certain time, if trying to recover the ammonia gas supplied to the second reactor 75 on a preferential basis, the exhaust temperature at the time the ammonia gas supplied to the second reactor 75 finishes being recovered is liable to fall too much. As a result, even if trying to recover the ammonia gas supplied to the first reactor 72, the exhaust temperature is liable to become too low and the ammonia gas supplied to the first reactor 72 is liable to become unable to be recovered.

At step S135, the electronic control unit 200 judges if the downstream side exhaust temperature has continued to rise for a certain time. This is because if the downstream side exhaust temperature has continued to rise for a certain time, if waiting a bit, there is a high possibility that the downstream side exhaust temperature will rise about the low temperature side recovery temperature. Therefore, the electronic control unit 200 proceeds to step S136 if the downstream side exhaust temperature has continued to rise for a certain time, then sets the recovery priority flag of the second reactor 75 to "1". On the other hand, the electronic control unit 200 proceeds to step S137 if the downstream side exhaust temperature has continued to rise for a certain time, then returns the recovery priority flag of the second reactor 75 to "0".

FIG. 17 is a time chart explaining the operation of control of the chemical thermal storage device 70 according to the present embodiment.

If the engine body is started up at the time t1, the electronic control unit 200 judges if ammonia gas for supply to the first reactor 72 and second reactor 75 is stored in the tank 71 by judging if the tank pressure is the lower limit pressure P1 or more (FIG. 5; S1). At the time t1, the tank pressure is the lower limit pressure P1 or more, so the electronic control unit 200 judges if there is a demand for warm-up for the first catalytic converter 30 and second catalytic converter 50 (FIG. 5; S2, S3, S6). At the time t1, the first catalyst bed temperature is the first threshold value or less while, further, the second catalyst bed temperature is also the second threshold value or less, so the electronic control unit 200 performs first warm-up processing (FIG. 5; S4).

At the point of the time t1, the second catalyst bed temperature does not become the second threshold value or more even once after engine start, so the warm-up priority flag of the second catalytic converter 50 is set to "1". For this reason, the electronic control unit 200 judges if it is possible to cause an exothermic reaction at the second reactor 75 so as to preferentially supply ammonia gas to the second reactor 75 (FIG. 6; S12). At the time t1, the ammonia gas of the tank 71 is not supplied to the reactors 72, 75 and the ammonia gas adsorption amount of the second chemical thermal storage medium 753 does not reach the upper limit, so the electronic control unit 200 judges that an exothermic reaction can occur at the second reactor 75 and opens just the second valve 77 (FIG. 6; S12).

Due to this, ammonia gas is supplied from the tank 71 to the inside of the second reaction chamber 754 of the second reactor 75, so at the time t1 and on, the tank pressure falls, while the second heater pressure increases. Further, an exothermic reaction occurs where ammonia gas is chemically adsorbed at the second chemical thermal storage medium 753 at the second reactor 75, so at the time t1 and on, so the second reactor 75 causes the exhaust to be heated, the temperature of the exhaust flowing out from the second reactor 75, that is, the downstream side exhaust temperature, rises, and the second catalyst bed temperature rises.

By the first reactor 72 causing the exhaust to be heated, if, at the time t2, the second catalyst bed temperature becomes higher than the second threshold value, it is judged that there is also no demand for warm-up for the second catalytic converter 50, but, at the time t2, the first catalyst bed temperature is the first threshold value or less and there is a demand for warm-up for the first catalytic converter 30, so the electronic control unit 200 performs second warm-up processing (FIG. 5; S5).

If the second warm-up processing is performed, the electronic control unit 200 judges if it is possible to cause an exothermic reaction at the first reactor 72 (FIG. 7; S31). At the point of the time t2, the ammonia gas of the tank 71 is not supplied to the first reactor 72 and the ammonia gas adsorption amount of first chemical thermal storage medium 723 does not reach the upper limit, so the electronic control unit 200 judges that it is possible to cause an exothermic reaction at the first reactor 72, opens only the first valve 74, and closes the second valve 77 (FIG. 7; S32).

Due to this, ammonia gas is supplied from the tank 71 to the inside of the first reaction chamber 724 of the first reactor 72, so at the time t2 and on as well, the tank pressure falls while the first heater pressure increases. Note that, by the second valve 77 being closed, ammonia gas is no longer supplied to the inside of the second reaction chamber 754 of the second reactor 75, but unreacted ammonia gas partially remains at the inside of the second reaction chamber 754, so the second heater pressure increases in accordance with the rise of the exhaust temperature at the time t2 and on as well.

By ammonia gas being supplied from the tank 71 to the inside of the first reaction chamber 724 of the first reactor 72, an exothermic reaction occurs where the ammonia gas is chemically adsorbed at the first chemical thermal storage medium 723 at the first reactor 72, so at the time t2 and on, the first reactor 72 is used to heat the exhaust, the temperature of the exhaust flowing out from the first reactor 72 (that is, downstream side exhaust temperature) rises, and the first catalyst bed temperature rises.

By the first reactor 72 causing the exhaust to be heated, if, at the time t3, the first catalyst bed temperature becomes higher than the first threshold value, it is judged that there is also no demand for warm-up of the first catalytic converter 30. Further, at the point of the time t3, the tank pressure is higher than the lower limit pressure P1, so fourth warm-up processing is performed (FIG. 6; S8). As a result, the first valve 74 is also closed (FIG. 9; S51). At the time t3 and on, the state is one where both the first valve 74 and second valve 77 are closed, and ammonia gas recovery processing is performed (FIG. 5; S10).

In the ammonia gas recovery processing, in the interval from the time t3 to the time t4, the tank pressure is lower than the upper limit pressure P2 and, further, ammonia gas is supplied to the first reactor 72 and second reactor 75, so it is judged that there is a demand for recovery for the two reactors 72, 75 and the first recovery processing is performed (FIG. 10; S61 to S64):

Further, in the interval from the time t3 to the time t4, the downstream side exhaust temperature is lower than the low temperature side recovery temperature, but the downstream side exhaust temperature continues to rise, so the recovery priority flag of the second reactor 75 is set to "1". For this reason, in the first recovery processing, it is judged if the ammonia gas supplied to the second reactor 75 can be recovered (FIG. 11; S71, S72). As a result, from the time t3 to the time t4, the downstream side exhaust temperature is lower than the low temperature side recovery temperature, so the first valve 74 and second valve 77 respectively remain closed (FIG. 11; S75).

Further, if the downstream side exhaust temperature becomes the low temperature side recovery temperature or more at the time t4, just the second valve 77 is opened (FIG. 11; S73). Due to this, a reaction occurs where ammonia gas is desorbed from the second chemical thermal storage medium 753 in the second reaction chamber 754 and the ammonia gas inside the second reaction chamber 754 moves to the tank 71, so at the time t4 and on, the tank pressure increases and on the other hand the second heater pressure falls.

Further, if the tank pressure becomes the second heater pressure or more at the time t5 (if the tank pressure and second heater pressure become equal), the electronic control unit 200 judges that the ammonia gas supplied to the second reactor 75 has finished being recovered and closes the second valve 77 (FIG. 11; S75). Note that, in the present embodiment, in the time period from the time t4 to the time t5, that is, the time period when the ammonia gas supplied to the second reactor 75 is being preferentially recovered, the electronic control unit 200 opens only the second valve 77 and closes the first valve 74 so that the opening degree of the second valve 77 becomes larger than the opening degree of the first valve 74, but in this time period, the first valve 74 may also be opened in a range where the opening degree of the first valve 74 does not become larger than the opening degree of the second valve 77.

At the time t5 and on, since the ammonia gas supplied to the second reactor 75 has finished being recovered and thereby there is no longer a demand for recovery to the second reactor 75, second recovery processing is performed. As a result, up to the time t6, the upstream side exhaust temperature is lower than the high temperature side recovery temperature, so the first valve 74 and second valve 77 remain closed (FIG. 12; S94).

Further, if the upstream side exhaust temperature becomes the high temperature side recovery temperature or more at the time t6, the first valve 74 is opened. Due to this, inside the first reaction chamber 724, a reaction occurs where ammonia gas is desorbed from the first chemical thermal storage medium 723 and the ammonia gas in the first reaction chamber 724 moves to the tank 71, so at the time t6 and on, the tank pressure increases and on the other hand, the first heater pressure falls.

Further, if the tank pressure becomes the first heater pressure or more at the time t7 (if the tank pressure and the first heater pressure become equal), the electronic control unit 200 judges that the ammonia gas supplied to the first reactor 72 has finished being recovered and closes the first valve 74 (FIG. 12; S94). Note that, in the present embodiment, in the time period from the time t6 to the time t7, that is, the time period after preferentially recovering the ammonia gas supplied to the second reactor 75 when recovering the ammonia gas supplied to the first reactor 72, just the first valve 74 is opened and the second valve 77 is closed so that the opening degree of the first valve 74 becomes larger than the opening degree of the second valve 77, but at this time period, the second valve 77 may also be opened in the range where the opening degree of the second valve 77 becomes larger than the opening degree of the first valve 74.

The above explained internal combustion engine 100 according to the present embodiment is provided with an engine body 1, a first catalytic converter 30 (first heated object) arranged at the exhaust pipe 21 (exhaust passage) of the engine body 1, a second catalytic converter 50 (second heated object) arranged at the exhaust pipe 21 at the downstream side from the first catalytic converter 30, a chemical thermal storage device 70 configured to heat the first catalytic converter 30 and second catalytic converter 50, and an electronic control unit 200 (control device) configured to control the chemical thermal storage device 70.

Further, the chemical thermal storage device 70 is provided with a tank 71 (storage part) configured to store a reaction medium comprised of ammonia gas, a first reactor 72 (first heater) including a first chemical thermal storage medium 723 (first element) generating heat when chemically adsorbing a reaction medium supplied from the tank 71 through a first connection pipe 73 and causing the reaction medium to be desorbed if heated by the heat of exhaust in the state chemically adsorbing the reaction medium and arranged in an exhaust pipe 21 at the upstream side from the first catalytic converter 30, a second reactor 75 (second heater) including a second chemical thermal storage medium 753 (second element) generating heat when chemically adsorbing a reaction medium supplied from the tank 71 through a second connection pipe 76 and causing the reaction medium to be desorbed if heated by the heat of exhaust in the state chemically adsorbing the reaction medium and arranged in the exhaust pipe 21 between the first catalytic converter 30 and the second catalytic converter 50, a first valve 74 arranged at a first connection pipe 73, and a second valve 77 arranged at a second connection pipe 76.

Further, the electronic control unit 200 is configured so as to control the first valve 74 and the opening degree of the second valve 77 so that the reaction medium chemically adsorbed at the second chemical thermal storage medium 753 is preferentially recovered at the tank 71 when the reaction medium is chemically adsorbed at both the first chemical thermal storage medium 723 and second chemical thermal storage medium 753.

Specifically, the electronic control unit 200 is configured to increase the opening degree of the second valve 77 over the opening degree of the first valve 74 and recover the reaction medium desorbed from the second chemical thermal storage medium 753 at the tank 71 when the temperature of the exhaust flowing into the second reactor 75 becomes a low temperature side recovery temperature (first recovery temperature) or more if preferentially storing the reaction medium supplied to the second reactor 75 and chemically adsorbed at the second chemical thermal storage medium 753 in the tank 71 and to increase the opening degree of the first valve 74 over the opening degree of the second valve 77 and recover the reaction medium desorbed from the first chemical thermal storage medium 723 at the tank 71 when the temperature of the exhaust flowing into the first reactor 72 becomes a high temperature side recovery temperature (second recovery temperature) or more after the end of recovery.

In other words, the electronic control unit 200 is configured so as to be provided with a first recovery control part configured to increase the opening degree of the second valve 77 over the opening degree of the first valve 74 and recover the reaction medium desorbed from the second chemical thermal storage medium 753 (second element) at the tank 71 (storage part) when the temperature of the exhaust flowing into the second reactor 75 becomes the low temperature side recovery temperature (first recovery temperature) or more, a recovery judging part configured to judge if the reaction medium desorbed from the second chemical thermal storage medium 753 has finished being recovered, and a second recovery control part configured to increase the opening degree of the first valve 74 over the opening degree of the second valve 77 and recover the reaction medium desorbed from the first chemical thermal storage medium 723 (first element) at the tank 71 when the temperature of the exhaust flowing into the first reactor 72 (first heater) becomes a high temperature side recovery temperature (second recovery temperature) higher than the low temperature side recovery temperature or becomes more if it is judged that the reaction medium desorbed from the second chemical thermal storage medium 753 has finished being recovered.

In this way, in the present embodiment, the chemical thermal storage device 70 is configured so as to enable the ammonia gas stored in the tank 71 to be supplied to the first reactor 72 and second reactor 75. For this reason, when supplying the reaction medium to both the first reactor 72 and second reactor 75, the tank pressure becomes relatively low. Therefore, it is possible to control the opening degree of the first valve 74 and the second valve 77 so that the reaction medium supplied to the second reactor 75 is recovered preferentially at the tank 71 and thereby make the recovery temperature of the second reactor 75 lower than the recovery temperature of the first reactor 72.

Accordingly, compared with the upstream side of the exhaust pipe, it is possible to easily recover the reaction medium from the second reactor 75 arranged at the downstream side of the exhaust pipe where the exhaust temperature becomes lower. Further, a single tank 71 storing the reaction medium is sufficient, so the chemical thermal storage device 70 can be kept from becoming large in size.

Above, embodiments of the present invention were explained, but the above embodiments are only show part of the examples of application of the present invention. The technical scope of the present invention is not limited to the specific configurations of the above embodiments.

For example, in the above embodiment, the engine body 1 was configured to make the fuel burn by compression self-ignition, but it may also be configured to make it burn by spark ignition.

Further, in the above embodiments, as one example of the combination of the reaction medium and chemical thermal storage medium, ammonia gas and magnesium chloride were illustrated, but the invention is not limited to this combination.

Further, in the above embodiments, the chemical thermal storage device 70 was configured to supply ammonia gas stored in the tank 71 to the two reactors of the first reactor 72 and second reactor 75, but the chemical thermal storage device 70 may also be configured to supply it to three or more reactors.

Further, in the above embodiments, reactors were used to warm up the catalytic converter, but what the reactors are used to warm up (or heat) is not limited to the catalytic converter. For example, they may also cover the particulate trapping device 40 or other various parts arranged in the exhaust pipe 21.

REFERENCE SIGNS LIST 1. engine body
21. exhaust pipe (exhaust passage)
30. first catalytic converter (first heated object)
50. second catalytic converter (second heated object)
70. chemical thermal storage device
71. tank (storage part)
72. first reactor (first heater)
723. first chemical thermal storage medium (first element)
73. first connection pipe
74. first valve
75. second reactor (second heater)
753. second chemical thermal storage medium (second element)
76. second connection pipe
77. second valve
100. internal combustion engine
200. electronic control unit (control device)

What is claimed is:

1. An internal combustion engine comprising:
an engine body;
a first heated object arranged at an exhaust passage of the engine body;
a second heated object arranged at the exhaust passage at a downstream side from the first heated object;
a chemical thermal storage device configured to heat the first heated object and the second heated object; and
a control device configured to control the chemical thermal storage device,
wherein the chemical thermal storage device comprises:
a storage part configured to store a reaction medium;
a first heater including a first element generating heat when a reaction medium supplied from the storage part through a first connection pipe is chemically adsorbed and causing the reaction medium to be desorbed if heated by the exhaust heat in a state where the reaction medium is chemically adsorbed and arranged in the exhaust passage at an upstream side from the first heated object;
a second heater including a second element generating heat when a reaction medium supplied from the storage part through a second connection pipe is chemically adsorbed and causing the reaction medium to be desorbed if heated by the exhaust heat in a state where the reaction medium is chemically adsorbed and arranged in the exhaust passage between the first heated object and second heated object;
a first valve arranged at the first connection pipe; and
a second valve arranged at the second connection pipe, and
the control device is configured to control opening degrees of the first valve and second valve so that when the reaction medium is chemically adsorbed at both the first element and the second element and is in a state where the reaction medium chemically adsorbed at the second element can be recovered, the reaction medium chemically adsorbed at the second element is recovered at the storage part.

2. The internal combustion engine according to claim 1, wherein the control device is configured;
so as to increase an opening degree of the second valve over an opening degree of the first valve to recover a reaction medium desorbed from the second element at the storage part when a temperature of exhaust flowing into the second heater becomes a first recovery temperature or more if the reaction medium supplied to the second heater and chemically adsorbed at the second element is recovered at the storage part; and
so as to increase an opening degree of the first valve over an opening degree of the second valve to recover a reaction medium desorbed from the first element at the storage part when a temperature of exhaust flowing into the first heater becomes a second recovery temperature higher than the first recovery temperature or becomes more after the completion of recovery.

3. The internal combustion engine according to claim 1, wherein the control device comprises:
a first recovery control part configured to increase an opening degree of the second valve over an opening degree of the first valve in order to recover the reaction medium desorbed from the second element at the storage part when the temperature of the exhaust flowing into the second heater becomes a first recovery temperature or more;
a recovery judging part configured to judge if the reaction medium desorbed from the second element has finished being recovered; and
a second recovery control part configured to increase an opening degree of the first valve over an opening degree of the second valve in order to recover the reaction medium desorbed from the first element at the storage part when the temperature of the exhaust flowing into the first heater becomes a second recovery temperature or more higher than the first recovery temperature if it is judged that the reaction medium desorbed from the second element has finished being recovered.

4. An internal combustion engine comprising:
an engine body;
a first heated object arranged at an exhaust passage of the engine body;
a second heated object arranged at the exhaust passage at a downstream side from the first heated object;
a chemical thermal storage device configured to heat the first heated object and the second heated object; and
a control device configured to control the chemical thermal storage device,
wherein the chemical thermal storage device comprises:
a storage part configured to store a reaction medium;
a first heater including a first element generating heat when a reaction medium supplied from the storage part through a first connection pipe is chemically adsorbed and causing the reaction medium to be desorbed if heated by the exhaust heat in a state where the reaction medium is chemically adsorbed and arranged in the exhaust passage at an upstream side from the first heated object;

a second heater including a second element generating heat when a reaction medium supplied from the storage part through a second connection pipe is chemically adsorbed and causing the reaction medium to be desorbed if heated by the exhaust heat in a state where the reaction medium is chemically adsorbed and arranged in the exhaust passage between the first heated object and second heated object;

a first valve arranged at the first connection pipe; and a second valve arranged at the second connection pipe, and the control device is configured to increase an opening degree of the second valve to become larger than an opening degree of the first valve to recover a reaction medium desorbed from the second element at the storage part when the reaction medium is chemically adsorbed at both the first element and the second element.

5. An internal combustion engine comprising:

an engine body;

a first heated object arranged at an exhaust passage of the engine body;

a second heated object arranged at the exhaust passage at a downstream side from the first heated object;

a chemical thermal storage device configured to heat the first heated object and the second heated object; and a control device configured to control the chemical thermal storage device, wherein the chemical thermal storage device comprises:

a storage part configured to store a reaction medium;

a first heater including a first element generating heat when a reaction medium supplied from the storage part through a first connection pipe is chemically adsorbed and causing the reaction medium to be desorbed if heated by the exhaust heat in a state where the reaction medium is chemically adsorbed and arranged in the exhaust passage at an upstream side from the first heated object;

a second heater including a second element generating heat when a reaction medium supplied from the storage part through a second connection pipe is chemically adsorbed and causing the reaction medium to be desorbed if heated by the exhaust heat in a state where the reaction medium is chemically adsorbed and arranged in the exhaust passage between the first heated object and second heated object;

a first valve arranged at the first connection pipe; and a second valve arranged at the second connection pipe, and the control device is configured to control opening degrees of the first valve and second valve so that when the reaction medium is chemically adsorbed at both the first element and the second element, the reaction medium chemically adsorbed at the second element is first recovered at the storage part before the reaction medium chemically adsorbed at the first element.

* * * * *